United States Patent
Gill et al.

(10) Patent No.: US 10,558,478 B2
(45) Date of Patent: Feb. 11, 2020

(54) SPECIFICATION-BASED COMPUTING SYSTEM CONFIGURATION

(71) Applicant: Nutanix, Inc., San Jose, CA (US)

(72) Inventors: Binny Sher Gill, San Jose, CA (US); Carl David Sutton, San Martin, CA (US); Ranjan Parthasarathy, Milpitas, CA (US)

(73) Assignee: NUTANIX, INC., San Jose, CA (US)

( * ) Notice: Subject to any disclaimer, the term of this patent is extended or adjusted under 35 U.S.C. 154(b) by 221 days.

(21) Appl. No.: 15/842,436

(22) Filed: Dec. 14, 2017

(65) Prior Publication Data

US 2019/0354390 A1 Nov. 21, 2019

Related U.S. Application Data

(60) Provisional application No. 62/434,456, filed on Dec. 15, 2016.

(51) Int. Cl.
| | |
|---|---|
| *G06F 11/00* | (2006.01) |
| *G06F 9/455* | (2018.01) |
| *G06F 9/48* | (2006.01) |
| *G06F 9/50* | (2006.01) |
| *G06F 11/07* | (2006.01) |

(52) U.S. Cl.
CPC ........ *G06F 9/45512* (2013.01); *G06F 9/4843* (2013.01); *G06F 9/505* (2013.01); *G06F 9/5027* (2013.01); *G06F 11/0721* (2013.01); *G06F 11/0751* (2013.01); *G06F 11/0793* (2013.01)

(58) Field of Classification Search
CPC .................................................. G06F 11/0721
USPC ............................................. 714/15, 16, 4.1
See application file for complete search history.

(56) References Cited

U.S. PATENT DOCUMENTS

| | | |
|---|---|---|
| 8,549,518 B1 | 10/2013 | Aron et al. |
| 8,601,473 B1 | 12/2013 | Aron et al. |
| 8,850,130 B1 | 9/2014 | Aron et al. |
| 8,997,097 B1 | 3/2015 | Aron et al. |
| 9,052,936 B1 | 6/2015 | Aron et al. |

(Continued)

OTHER PUBLICATIONS

Non-Final Office Action dated Apr. 30, 2019 for U.S. Appl. No. 15/842,698, 15 pages.

(Continued)

*Primary Examiner* — Dieu Minh T Le
(74) *Attorney, Agent, or Firm* — Foley & Lardner LLP

(57) ABSTRACT

Systems for managing a distributed computing system. A method embodiment commences upon receiving user-provided specification parameters that describe a target state of a computing entity. After generating a set of resource management commands to achieve the specified target state of a computing entity, the resource management commands are scheduled for execution. As execution of the resource management commands is being carried out, the execution status of the resource management commands is continuously monitored. If performance of the resource management commands raises an error and/or the resource entity state is different than predicted, a set of remediation actions are determined, and an additional set of processing operations are invoked to accomplish the remediation actions. When all resource management commands and/or any remediation actions have completed successfully, the target resource entity state has been achieved. The user did not need to write executable code to perform steps that pursue the target state.

20 Claims, 12 Drawing Sheets

(56) References Cited

U.S. PATENT DOCUMENTS

| | | | |
|---|---|---|---|
| 9,256,374 | B1 | 2/2016 | Aron et al. |
| 9,256,475 | B1 | 2/2016 | Aron et al. |
| 9,354,912 | B1 | 5/2016 | Aron et al. |
| 9,389,887 | B1 | 7/2016 | Aron et al. |
| 9,575,784 | B1 | 2/2017 | Aron et al. |
| 9,612,815 | B1 | 4/2017 | Jagtap et al. |
| 9,619,257 | B1 | 4/2017 | Aron et al. |
| 9,772,866 | B1 | 9/2017 | Aron et al. |
| 2004/0122830 | A1 | 6/2004 | Schwartz et al. |
| 2007/0220039 | A1 | 9/2007 | Waldman et al. |
| 2008/0134178 | A1 | 6/2008 | Fitzgerald et al. |
| 2010/0145929 | A1 | 6/2010 | Burger et al. |
| 2011/0096687 | A1 | 4/2011 | Döttling et al. |
| 2012/0166977 | A1 | 6/2012 | Demant et al. |
| 2012/0203911 | A1 | 8/2012 | London et al. |
| 2012/0254719 | A1 | 10/2012 | Hackmann et al. |
| 2012/0291042 | A1 | 11/2012 | Stubbs et al. |
| 2014/0046638 | A1 | 2/2014 | Peloski |
| 2014/0282586 | A1 | 9/2014 | Shear et al. |
| 2016/0055026 | A1 | 2/2016 | Fitzgerald et al. |
| 2018/0018082 | A1 | 1/2018 | Sarbin et al. |

OTHER PUBLICATIONS

U.S. Appl. No. 15/818,704, filed Nov. 20, 2017, 71 pages.
"What are protocol buffers?". Google Developers. Sep. 5, 2017. 2 pages.
Wikipedia. "Anonymous function". Sep. 16, 2017. 38 pages.
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Non-Final Office Action dated Apr. 26, 2019 for U.S. Appl. No. 15/842,869, 17 pages.

SPECIFICATION-BASED COMPUTING SYSTEM CONFIGURATION

RELATED APPLICATIONS

The present application claims the benefit of priority to U.S. Patent Application Ser. No. 62/434,456 titled "INTENT FRAMEWORK", filed on Dec. 15, 2016, which is hereby incorporated by reference in its entirety; and the present application is related to U.S. patent application Ser. No. 15/842,698 titled "RESOURCE STATE ENFORCEMENT", filed on even date herewith, which is hereby incorporated by reference in its entirety; and the present application is related to U.S. patent application Ser. No. 15/842,896 titled "USER INTERFACE VIEW GENERATION", filed on even date herewith, which is hereby incorporated by reference in its entirety; and the present application is related to U.S. patent application Ser. No. 15/842,837 titled "RULE-BASED DATA PROTECTION", filed on even date herewith, which is hereby incorporated by reference in its entirety; and the present application is related to co-pending U.S. patent application Ser. No. 15/842,714 titled "ACCESSING COMPUTING RESOURCE ATTRIBUTES OF AN EXTERNAL SERVICE PROVIDER", filed on even date herewith, which is hereby incorporated by reference in its entirety.

FIELD

This disclosure relates to distributed computing, and more particularly to techniques for specification-based computing system configuration.

BACKGROUND

Computing system vendors provide their users (e.g., customers, integrators, etc.) with libraries of application programming interfaces (APIs) that are used by the users to control and/or extend the capabilities of the computing system. A user might combine multiple API calls into a procedure or subroutine that can be run to accomplish some purpose and/or to reach some state on the computing system. For example, a sequence of API calls might be run to manage one or more resource entities (e.g., virtual machines (VMs), virtual disks (vDisks), etc.) of the computing system. In some cases, a first user might combine multiple API calls into what that first user believes is an appropriate procedure or subroutine to accomplish a particular purpose (e.g., create a particular VM to have certain attributes and/or to perform a certain set of tasks) or to reach a particular state on the computing system (e.g., to have an allocated and initialized vDisk), while a second user might combine a different set of API calls into what the second user believes is an appropriate procedure or subroutine to accomplish the same effects (e.g., create the same VM with the same certain attributes, tasks and resources). While the first user's procedure and the second user's procedure may both in fact accomplish the same effects, one way or another way is often more efficient or more reliable, or faster, or for other reasons is preferred.

Uses of multiple API calls to achieve what is believed to be an appropriate procedure or subroutine is not isolated to developers. Administrators and other non-developer users today are more and more frequently taking advantage of the flexibility of modern computing systems by customizing the configuration of their systems. This leads to an increasing number of different configuration procedures (e.g., combinations of API calls) that are developed and issued to perform the customized integrations. Moreover, the varied programming skills and/or styles of both developers and non-developer users alike can lead to sub-optimal procedures (e.g., procedures that perform slowly, procedures that are error inducing, procedures that are wasteful of resources, etc.).

With the ever-increasing complexity of modern computing systems, users cannot reasonably be expected to know, for example, the intricacies of the often-changing set of vendor-supplied APIs, the performance of the APIs under different conditions, the performance of the APIs in different permutations, and/or the behavior of the APIs (e.g., exemplified by intended or unintended behaviors) in user-managed system integrations.

Unfortunately, a computer system vendor with many users of varying programming skill levels and/or styles faces an undesired situation in which the computer system vendor needs to support numerous combinations of API calls. In this situation, the computer system vendor needs to develop a codebase that can accommodate (e.g., test, execute, document, etc.) all such combinations of API calls, including sub-optimal user-defined procedures. The codebase of the computer system vendor also needs to handle implementation of the user-developed procedures under varying system conditions. Vendors want to offer users a standardized, vendor-supported way to accomplish a particular purpose and/or to reach a particular state on a computing system without reliance on any particular procedure development skill level of their users.

Therefore, what is needed is a technique or techniques to improve over procedure development techniques and/or over other considered approaches that address configuring complex computing systems that are used by numerous users with varying skills.

SUMMARY

The present disclosure describes techniques used in systems, methods, and in computer program products for specification-based computing system configuration, which techniques advance the relevant technologies to address technological issues with legacy approaches. More specifically, the present disclosure describes techniques used in systems, methods, and in computer program products for configuring computing systems using resource state specifications. Certain embodiments are directed to technological solutions for automatically converting specifications of a target resource state to a set of resource management commands that are executed to achieve the target resource state in a computing system.

The disclosed embodiments modify and improve over legacy approaches. In particular, the herein-disclosed techniques provide technical solutions that address the technical problems attendant to facilitating user-managed configurations of complex computing systems that are managed by numerous users with varying configuration procedure development skills. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of computing platform management as well as advances in various technical fields related to virtualized computing systems.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
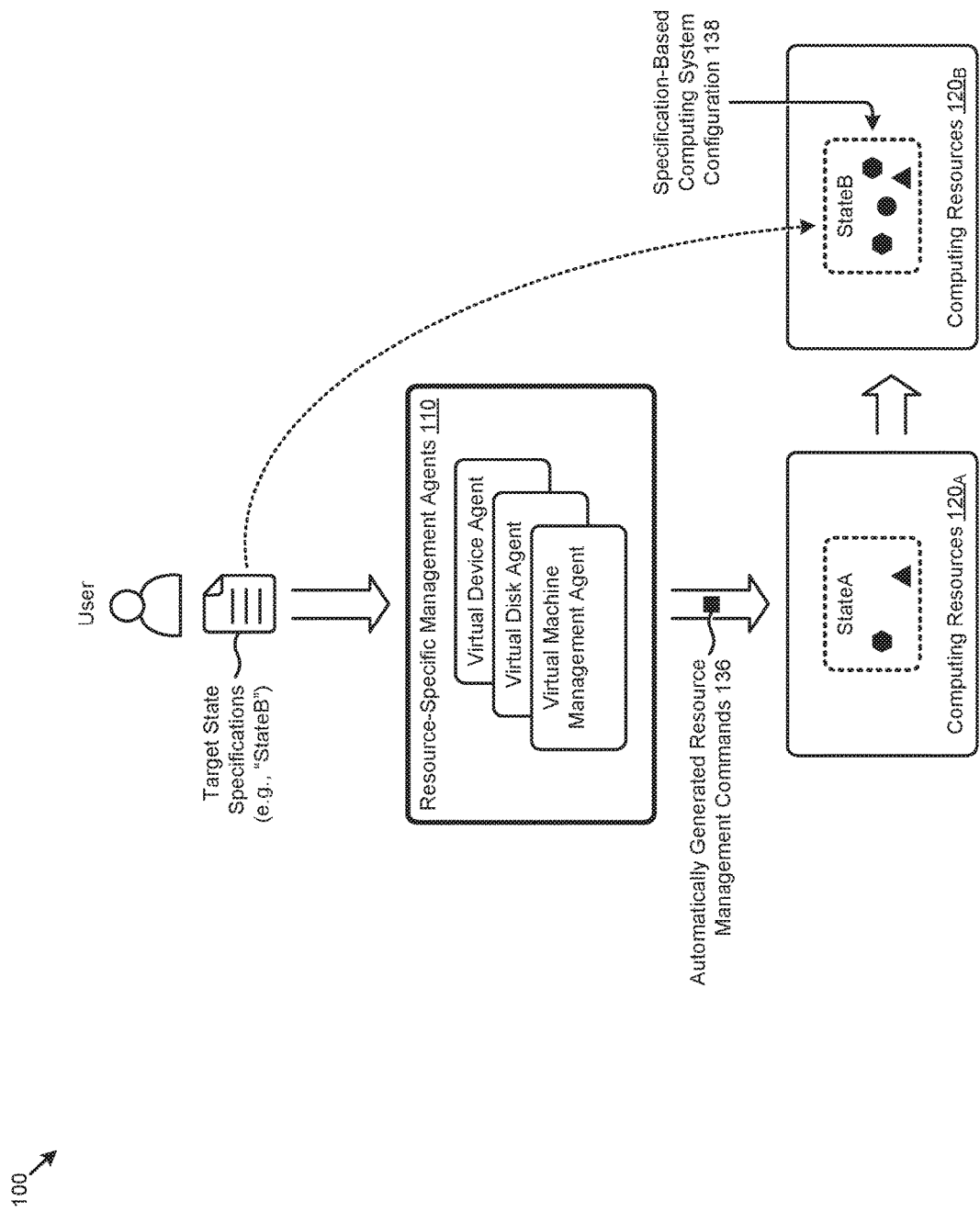
FIG. 1 exemplifies a computing environment in which embodiments can operate.

Embodiments in accordance with the present disclosure address the problem of facilitating user-managed configurations of complex computing systems that are managed by numerous users with varying configuration procedure development skills. Some embodiments are directed to approaches for automatically converting specifications of a target resource state to a set of resource management commands that are executed to achieve the target resource state in a computing system. The accompanying figures and discussions herein present example environments, systems, methods, and computer program products for configuring computing systems using resource state specifications.

Overview

Disclosed herein are techniques that, rather than requiring that a user invoke the vendor's APIs in particular ways (e.g., to develop customized integrations), implement a specification-based approach to achieve desired resource states in a computing system. Techniques are disclosed whereby a user (e.g., customer, integrator, etc.) can specify a target state for one or more resource entities in a computing system. A set of resource management commands (e.g., compiled procedures) are automatically generated to achieve the specified target state. The resource management commands are scheduled for execution over the computing system. Progress towards achieving the target state is tracked by monitoring the status of the scheduled commands. In certain embodiments, additional actions (e.g., remedial actions) are invoked based at least in part on the status of the resource management commands (e.g., wait status, retry status/condition, occurrence of an error or trap or alert, etc.). In certain embodiments, the target state is codified in one or more resource specification objects. In certain embodiments, the resource management commands are generated based at least in part on certain then-current conditions of the computing system.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1 exemplifies a computing environment 100 in which embodiments can operate. As an option, one or more variations of computing environment 100 or any aspect thereof may be implemented in the context of the architecture and functionality of the embodiments described herein. The computing environment 100 or any aspect thereof may be implemented in any environment.

In computing environments such as computing environment 100, a user (e.g., customer, integrator, etc.) might want to configure certain computing resources in the computing system to accomplish some purpose. For example, the user might desire to establish a certain computing resource state (e.g., configuration) to carry out a particular set of tasks. More specifically, the resource state might correspond to a set of resource entities (e.g., virtual machines, executable containers, projects, catalogs, images, etc.) that each are configured to have attributes (e.g., specifications) that are capable of carrying out the tasks. Using certain procedure-centric approaches, the user might combine multiple resource management API calls into a procedure or subroutine that can be run to establish the desired or target resource state. As earlier mentioned, however, a computer system vendor with many users that have varying programming skill levels and/or styles faces an undesired situation in which the computer system vendor needs to support (e.g., test, execute, document, etc.) numerous combinations of API calls. Having to support multiple ways to achieve the same resource state results in many inefficiencies that are incurred by the computer system vendor.

Rather than requiring that a user invoke the vendor's resource management APIs in particular ways (e.g., to establish a target resource state), the herein disclosed techniques address the foregoing inefficiencies by implementing a specification-based approach to achieve target resource states in a computing system. As can be observed in FIG. 1, a user can develop a set of target state specifications (e.g., specifications for "StateB") for a set of computing resources (e.g., resource entities) in the computing environment 100. For example, the user might desire to transition a set of computing resources 120A that are in a "StateA" to a set of computing resources 120E that are in a "StateB". The target state specifications are processed by a set of resource-specific management agents 110 (e.g., virtual machine agent, executable container agent, project agent, catalog agent, image agent, etc.) to automatically generate (e.g., compile) a set of resource management commands (e.g., automatically generated resource management commands 136).

Strictly as one example scenario, suppose a first user wants to launch his/her virtual machine to perform certain types of database tasks, and suppose a second user wants to launch his/her virtual machine to perform the same or similar types of database tasks. Rather than relying on user-defined procedures that result in what might end up as two different and possibly both sub-optimal approaches to constructing the procedures from, for example API#1, API#2, API#3, etc., implementation of the techniques disclosed herein ameliorate the foregoing sub-optimal approaches by permitting a user to specify the desired state for his/her virtual machine in a specification document. The specification document is then used as an input to any one or more of a command compiler, a command scheduler, and a command monitor. The combination of the command compiler, the command scheduler and the command monitor cooperate to perform the commands in pursuit of the specified state, namely to launch his/her virtual machines to perform their respective types of database tasks.

After receiving the specification document comprising the desired state, and in pursuit of the desired state, a set of automatically generated resource management commands 136 are scheduled for execution over the computing environment 100. Execution of the automatically generated resource management commands serve to transition the computing resources from the then-current state to a particular specified target state. As an example, the automatically generated resource management commands serve to transition from an empty state or from a null state, or from any particular "StateA", or from any other state that is different from the target state being pursued. As such, the combined roles of the command compiler, the command scheduler, and the command monitor serve to eventually achieve the specification-based computing system configuration 138 (e.g., the target state "StateB"). Progress towards achieving the target state is tracked by monitoring the status of the scheduled commands until the user-specified virtual machine is configured to perform its intended set of database tasks. The user can avail results from his/her virtual machine even without ever writing any code or script statements.

One embodiment of a technique for establishing any of a variety of specification-based computing system configurations is disclosed in further detail as follows.

Figure 2:
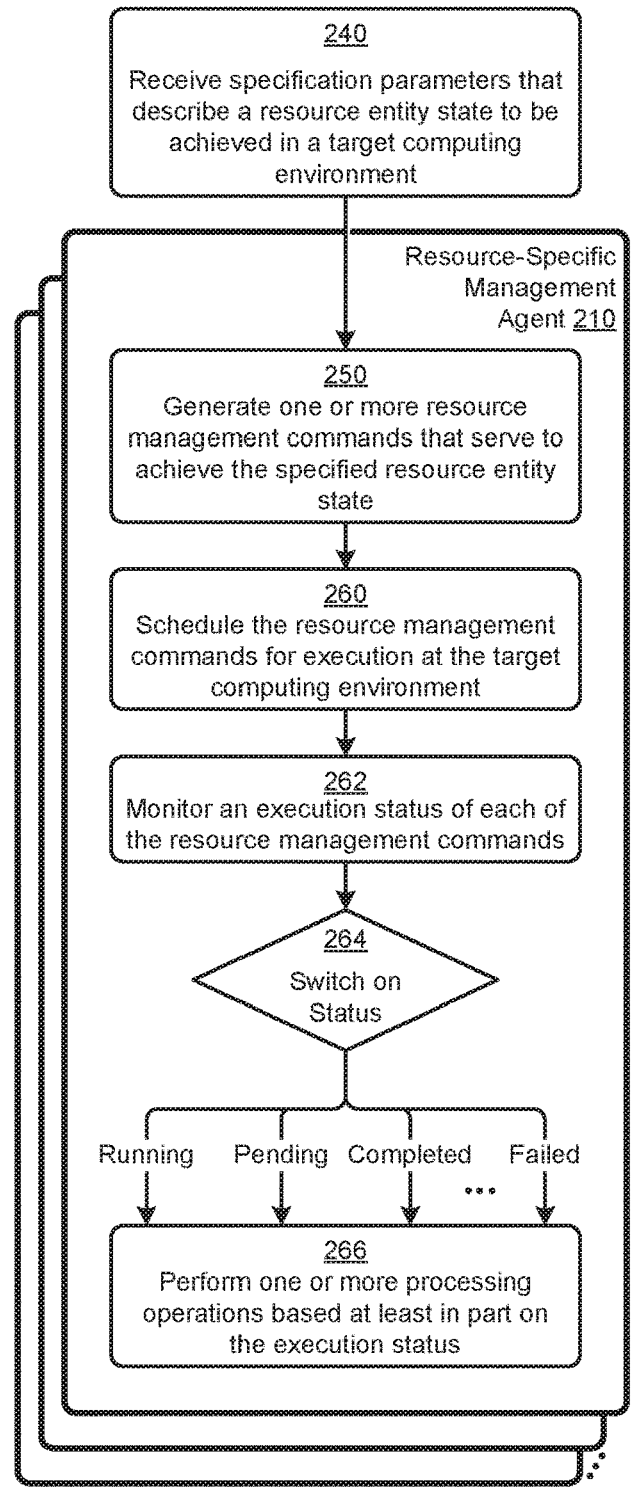
FIG. 2 depicts a specifications-based configuration technique as implemented in systems that facilitate configuring computing systems using resource state specifications, according to some embodiments.

FIG. 2 depicts a specifications-based configuration technique 200 as implemented in systems that facilitate configuring computing systems using resource state specifications. As an option, one or more variations of specifications-based configuration technique 200 or any aspect thereof may be implemented in the context of the architecture and functionality of the embodiments described herein. The specifications-based configuration technique 200 or any aspect thereof may be implemented in any environment.

The specifications-based configuration technique 200 presents one embodiment of certain steps and/or operations that facilitate configuring computing systems using resource state specifications. As shown, at least a portion of the steps and/or operations comprising the specifications-based configuration technique 200 can be performed at a resource-specific management agent 210 from a plurality of resource-specific management agents.

Certain behaviors of the steps and/or operations may vary based at least in part on the respective resource entity served by the particular resource-specific management agent. The specifications-based configuration technique 200 can commence by receiving a set of specification parameters that describe a resource entity state for a target computing environment (step 240). One or more resource management commands are generated to achieve the resource entity state at the target computing environment (step 250). As used herein, management commands are codifications of operations that can be carried out by a computer processor. A particular operation can be divided into constituent operations, and any of the constituent operations are further codifications of further operations that can be carried out by any one or more computer processors.

The resource management commands are scheduled for execution at the target computing environment (step 260). An execution status of each of the resource management commands is monitored (step 262). Based at least in part on the execution status (switch 264), certain processing operations are performed (step 266). For example, one or more processing operations (e.g., wait, retry, respond with error message, respond with results, etc.) might be invoked based at least in part on a "running" execution status, a "pending" execution status, a "completed" execution status, a "failed" execution status, and/or another execution status.

One embodiment of a system for implementing the specifications-based configuration technique 200 is disclosed as follows.

Figure 3:
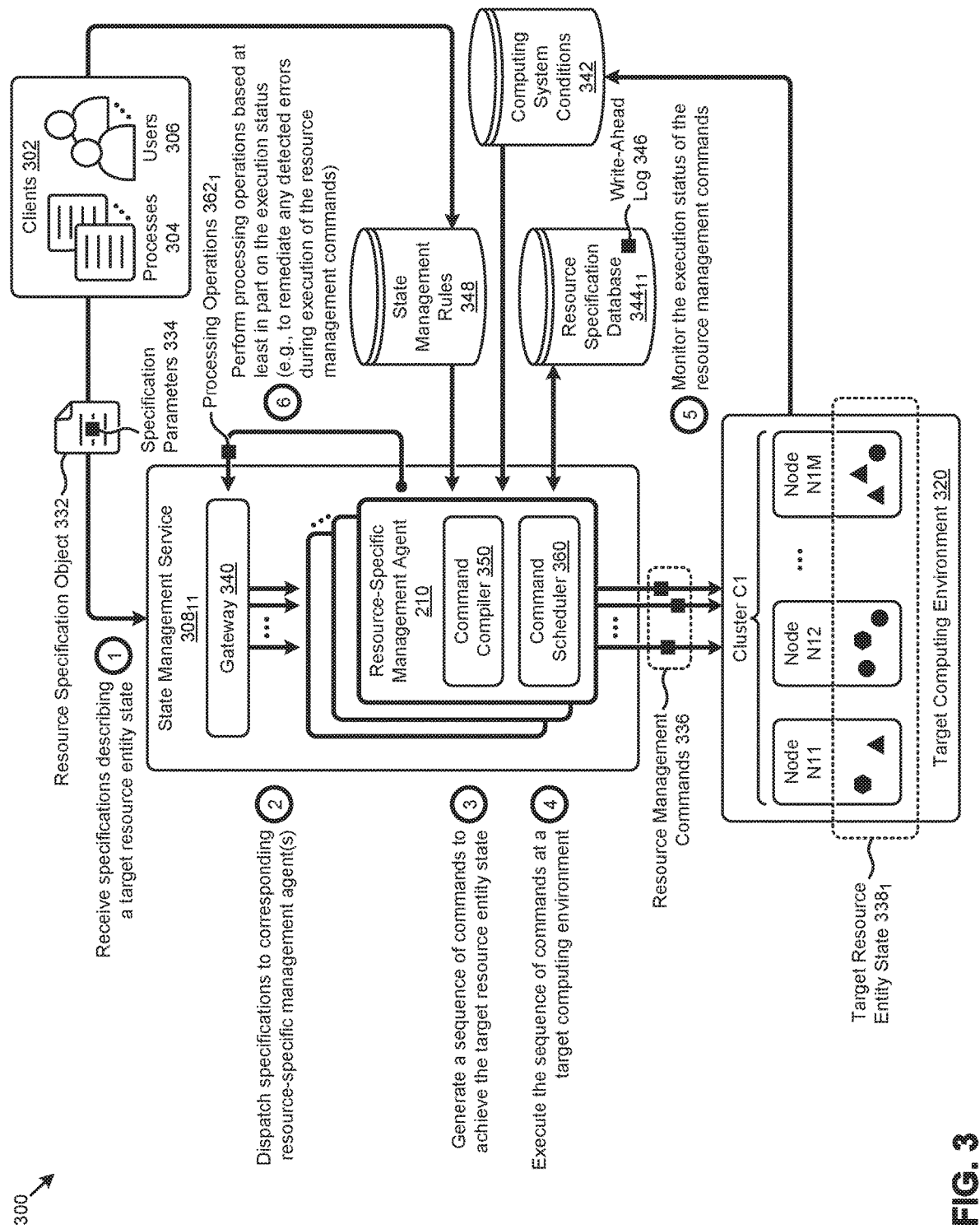
FIG. 3 is a block diagram of a system for configuring computing systems using resource state specifications, according to some embodiments.

FIG. 3 is a block diagram 300 of a system for configuring computing systems using resource state specifications. As an option, one or more variations of block diagram 300 or any aspect thereof may be implemented in the context of the architecture and functionality of the embodiments described herein. The block diagram 300 or any aspect thereof may be implemented in any environment.

The embodiment shown in FIG. 3 depicts merely one example of a computing system that supports configuration of computing system resources using resource state specifications according to the herein disclosed techniques. The components, data structures, and data flows shown in FIG. 3 present one partitioning and associated data manipulation approach. The specific example shown is purely exemplary, and other subsystems, data structures, and/or partitioning are reasonable.

Specifically, the computing system depicted in block diagram 300 comprises an instance of a state management service module (e.g., state management service $308_{11}$) that receives a set of specifications that describe a target resource entity state (operation 1). As can be observed, a set of specification parameters 334 codified in a resource specification object 332 (e.g., a Java Script Object Notation object (JSON object) from a web form) might be received from one or more clients 302. The clients 302 might comprise one or more users 306 and/or one or more processes 304 that issue the various resource specification objects to the state management service $308_{11}$ to accomplish respective purposes. For example, resource specification object 332 and its associated specification parameters 334 might be issued to state management service $308_{11}$ to achieve a target resource entity state $338_1$ at a target computing environment 320 (e.g., a cluster "C1" that comprises node "N11", node "N12", . . . , and node "N1M").

Specification parameters 334 received at state management service $308_{11}$ are dispatched by gateway 340 to one or more resource-specific management agents (e.g., resource-specific management agent 210) (operation 2). The resource-specific management agents are selected by gateway 340 based at least in part on the resource entities referenced by specification parameters 334. In certain embodiments, the resource-specific management agents might be implemented as plug-ins that are accessed from a resource management engine (e.g., an "intent" engine). A command compiler 350 at each instance of the resource-specific management agents (e.g., resource-specific management agent 210) invoked by gateway 340 generates a respective sequence of commands (Operation 3) to deploy target resource entity state $338_1$ at the target computing environment 320. In certain embodiments, command compiler 350 consults the then-current system conditions from a set of computing system conditions 342 when generating the commands.

A command scheduler 360 at each instance of the resource-specific management agents (e.g., resource-specific management agent 210) executes the commands at target computing environment 320 (operation 4). As illustrated, a set of resource management commands 336 might be issued for execution over target computing environment 320. Resource management commands 336 might be scheduled for sequential execution, parallel execution (e.g., concurrent execution), synchronous execution, asynchronous execution, and/or any combination thereof. Scheduling variations are further discussed with respect to Table 2, below.

The various instances of the command scheduler can also monitor the execution status of the resource management commands issued by the instances (operation 5). Each command scheduler instance might create a write-ahead log (e.g., write-ahead log 346) in a resource specification database $344_{11}$ to track its issued resource management commands. One or more of the command schedulers might invoke various instances of processing operations $362_1$ (e.g., at gateway 340) based at least in part on the monitored execution status (operation 6).

In certain embodiments, command compiler 350, command scheduler 360, and/or other components in the computing system of FIG. 3 might access a set of state management rules 348 to determine the constraints and/or logic to apply to any of the foregoing processes and/or operations. For example, state management rules 348 might be consulted when determining the sequence of resource management commands to deploy target resource entity state $338_1$, and/or scheduling those commands for execution at target computing environment 320.

As shown, the gateway 340 receives a specification document (e.g., resource specification object 332), and upon parsing or other processing of the resource specification object, a particular one or more of a plurality of resource-specific management agents is selected. Each of the one or more of a plurality of resource-specific management agents is composed of a command compiler 350 and a command scheduler 360. Although the term compiler is used herein as a component of a resource-specific management agent, such a compiler differs from a code compiler. Specifically, the compilers discussed herein do not receive as input any assembler code or high-order language code or scripting language code segments. Rather, the compiler as used herein considers the then-current condition of the underlying computing system, and based on the then-current condition, the compiler and/or its agents perform operations involving system-wide load balancing (e.g., to achieve a fair allocation across the system), system-level and node-level sizing (e.g., to avoid over-allocation of node or system resources), as well as node-level capabilities (e.g., to be able to assign resources to nodes that are matched in terms of capability demands with respect to capability availabilities). Moreover, the compilers and/or schedulers as used herein are configured to be able make entries into a write-ahead log such that the progression from an initial state through to a desired state can be monitored. In some cases, monitoring includes not only the progression through to the first time achievement of the specified state, but also ongoing monitoring so as to achieve ongoing compliance such that even after the first time achievement of the specified state, the desired target state is maintained over time.

Particular embodiments may specify and enforce entity compliance in relation to one or more resource management commands, API requests, and/or remote procedure calls (RPCs). Resource entities can have a compliance sub-resource that returns the portion (e.g., parameters) of the "spec" (e.g., resource specification object) that is either enforced or monitored by an explicit profile. Such profiles might be set by a system administrator (e.g., from users 306)

and stored in state management rules 348. The compliance sub-resource may be read-only for other users. The system (e.g., state management service $308_{11}$) updates a compliance status indicator (e.g., "type": "compliance" key-value pair) in an entity's resource specification object when the entity achieves or ceases to achieve compliance with a particular profile (e.g., "enforced_spec"). A portion of one embodiment of a resource specification object that comprises a compliance status indicator (at line 4) is shown in Table 1:

TABLE 1

Example resource specification object

| Line | Pseudo-code |
|---|---|
| 1 | { |
| 2 | "api_version": "string", |
| 3 | "metadata": { |
| 4 | "type": "compliance" |
| 5 | "enforced_spec": {...} |
| 6 | "UUID": "string" |
| 7 | "description": "string" |
| 8 | "parent_reference": "reference" |
| 9 | "entity_version": "int" |
| 10 | "creation_time": "string" |
| 11 | "last_update_time": "string" |
| 12 | "categories": { |
| 13 | "category_name1": "value" |
| 14 | "category_name2": "value" |
| 15 | } |
| 16 | } |

The compliance status pertaining to profiles may be used by a GUI to show entity compliance/non-compliance with the overall system. Particular embodiments may trigger an alert based at least in part on the compliance status.

The foregoing discussions describe a technique for processing received specification parameters (e.g., step 240 of FIG. 2), which techniques are disclosed in further detail as follows.

Figure 4:
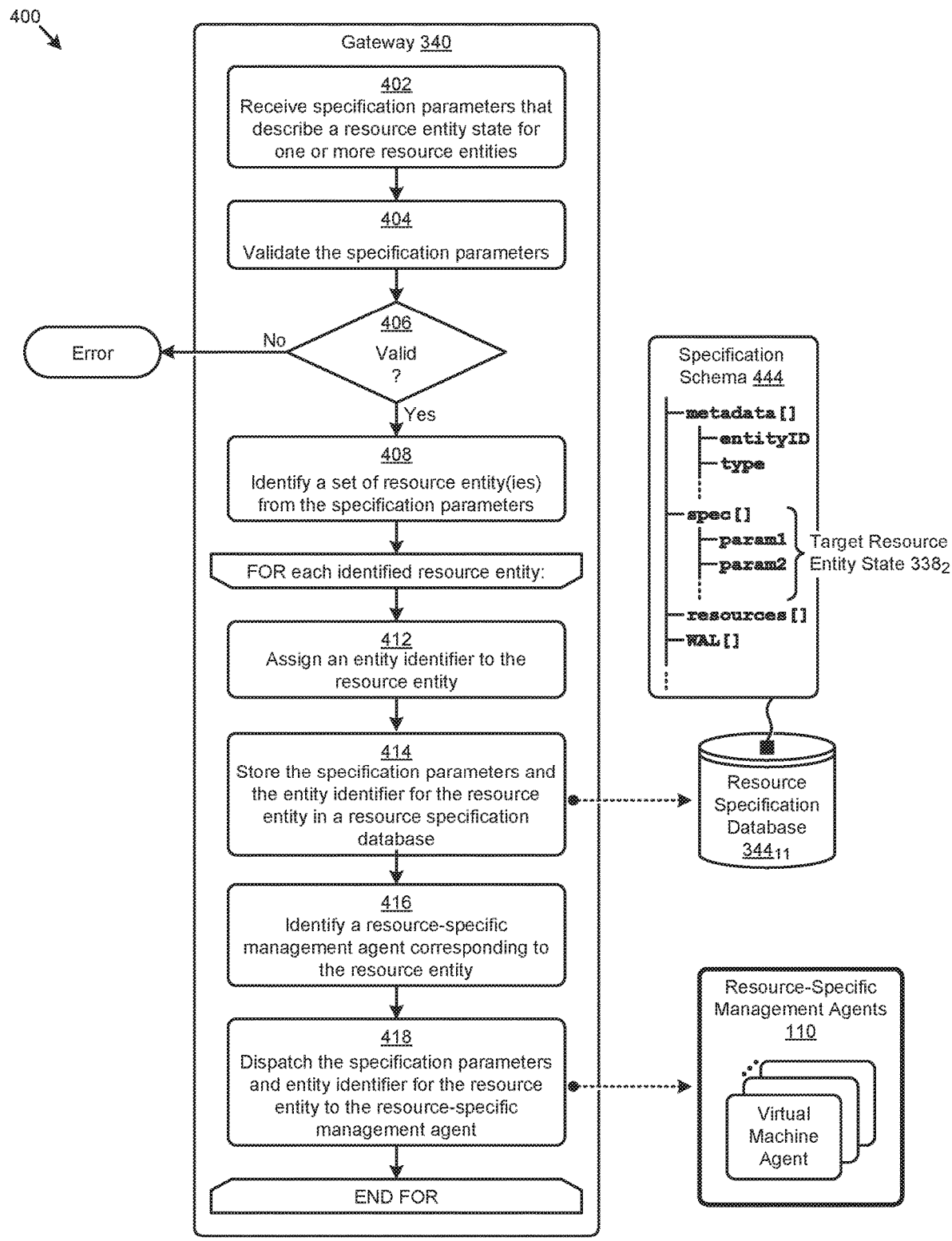
FIG. 4 is a specification dispatching technique as used in systems for configuring computing systems using resource state specifications, according to some embodiments.

FIG. 4 is a specification dispatching technique 400 as used in systems for configuring computing systems using resource state specifications. As an option, one or more variations of specification dispatching technique 400 or any aspect thereof may be implemented in the context of the architecture and functionality of the embodiments described herein. The specification dispatching technique 400 or any aspect thereof may be implemented in any environment.

The specification dispatching technique 400 presents one embodiment of certain steps and/or operations that process received specification parameters in accordance with the herein disclosed techniques. Various illustrations and specialized data structures are also presented to further describe certain aspects of the specification dispatching technique 400. As shown, the specification dispatching technique 400 might be implemented in gateway 340 earlier presented and described as pertains to FIG. 3.

The specification dispatching technique 400 can commence by receiving a set of specification parameters (step 402). Specification parameters are values (e.g., TRUE/FALSE indications, a quantity, etc.) that describe a resource entity state for one or more resource entities. For example, rather than rely on a procedure to create a file (e.g., create a directory, check for successful creation of the directory, call a procedure to create a file in the directory, check for success, etc.), a particular specification parameter with the particular semantics that correspond to a desired state of a file can be assigned a value (e.g., a file path) and that specification can be acted upon to achieve the desired state. As such the user does not need to have any particular skill level pertaining to procedure development.

The received specification parameters are validated (step 404). For example, the specification parameters might be validated in accordance with various structure, syntax, and/or other rules. If the specification parameters are not valid (see "No" path of decision 406), an error is returned. If the specification parameters are valid (see "Yes" path of decision 406), the resource entity or entities associated with the specification parameters are identified (step 408).

For each resource entity identified as associated with the received specification parameters, an entity identifier is assigned to the resource entity (step 412) and the specification parameters and entity identifier for the resource entity is stored in a resource specification database (step 414). For example, the foregoing specification information associated with the resource entity might be stored in resource specification database $344_{11}$ according to a specification schema 444. Specification schema 444 indicates that the specification information might be organized and/or stored in a tabular structure (e.g., relational database table) that has rows that relate various attributes to a particular resource entity. As another example, the information might be organized and/or stored in a programming code object that has instances corresponding to a particular resource entity and properties corresponding to the various attributes associated with the resource entity.

As depicted in specification schema 444, a data record (e.g., table row or object instance) for a particular resource entity might have a metadata section (e.g., in a "metadata[ ]" object) that includes a resource entity identifier (e.g., stored in an "entityID" field), a resource entity type identifier (e.g., stored in a "type" field), and/or other metadata. The data record might further comprise a specification section (e.g., in a "spec[ ]" object) that includes a set of specification parameters (e.g., stored in a "param1" field, a "param2" field, etc.) associated with the resource entity. In some cases, the set of parameters in the "spec[ ]" object describe a target resource entity state $338_2$ for a particular resource entity. A data record for a resource entity might further comprise a write-ahead log (e.g., in a "WAL[ ]" object), a resources section (e.g., in a "resource[ ]" object), and/or other data which are described in further detail herein.

A resource-specific management agent corresponding to the resource entity is identified (step 416). As an example, if the subject resource entity is a virtual machine, a virtual machine agent might be identified from a set of resource-specific management agents 110. The specification parameters and entity identifier for the resource entity are dispatched to the identified resource-specific management agent (step 418).

The foregoing discussions describe a technique for generating resource management commands (e.g., step 250 of FIG. 2), which techniques are disclosed in further detail as follows.

Figure 5:
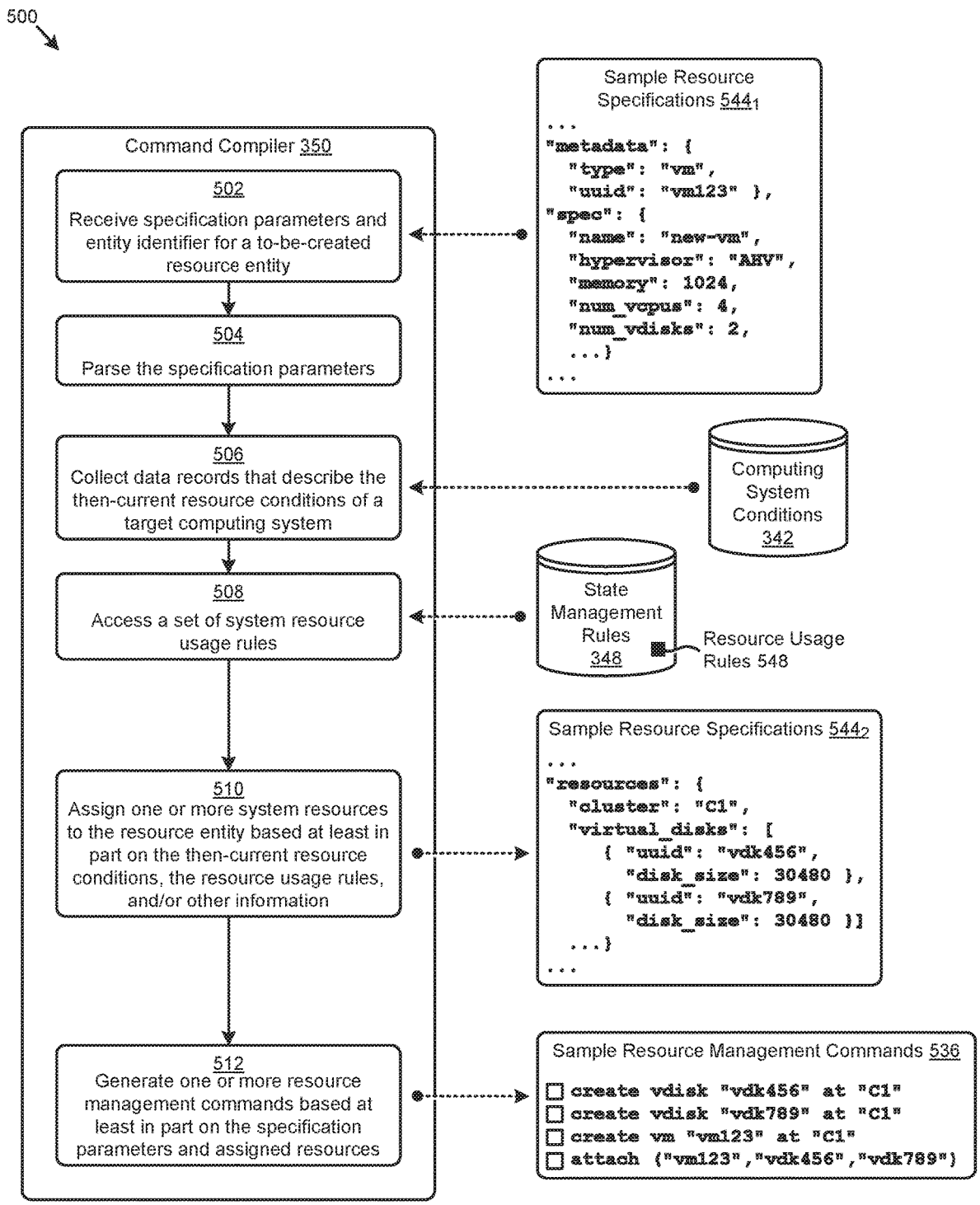
FIG. 5 depicts a resource command generation technique as used in systems for configuring computing systems using resource state specifications, according to an embodiment.

FIG. 5 depicts a resource command generation technique 500 as used in systems for configuring computing systems using resource state specifications. As an option, one or more variations of resource command generation technique 500 or any aspect thereof may be implemented in the context of the architecture and functionality of the embodiments described herein. The resource command generation technique 500 or any aspect thereof may be implemented in any environment.

The resource command generation technique 500 presents one embodiment of certain steps and/or operations that automatically generate resource management commands that are used to facilitate configuring computing systems using resource state specifications. Various illustrations, specialized data structures, and sample data are also presented to further describe certain aspects of the resource command generation technique 500. As shown, the resource command generation technique 500 might be implemented in the command compiler 350 of resource-specific management agent 210 as earlier presented and described as pertains to FIG. 3. The resource command generation technique 500 can be implemented in the command compiler of any respective resource-specific management agent.

The resource command generation technique 500 can commence by receiving a set of specification parameters and an associated entity identifier for a to-be-created resource entity (step 502). In some embodiments, the set of specification parameters and respective entity identifiers are received at a resource-specific management agent (e.g., entry point, thread, method subroutine, etc.) of the compiler. Strictly as an example, the specification parameters derived from sample resource specifications $544_1$ might be associated with a virtual machine identified as "vm123". Sample resource specifications $544_1$ can represent a target resource entity state for virtual machine "vm123". The resource specifications can be codified using any known techniques. As can be observed, sample resource specifications $544_1$ are structured to facilitate transmission to the resource-specific management agent using JSON. JSON is merely a convenient representation of data that can be easily parsed. The received specification parameters are parsed (step 504), possibly using any set of commercially-available JSON parsers that convert JSON text into a Java object and vice-versa. For example, sample resource specifications $544_1$ can be parsed by a JSON parser to determine various key-value pairs (e.g., "memory"="1024", "numvdisks"="2", etc.).

The resource command generation technique 500 also collects data records that described the then-current resource condition of a target computing system (step 506). Such conditions might be collected from computing system conditions 342 and indicate, for example, system resources (e.g., nodes, CPUs, memory, storage devices, etc.) available, the resource utilization, and/or other computing system conditions. The then-current resource conditions with respect to a set of respective system resources can be combined into a pattern or template. For example, if a virtual machine specification calls for a two CPUs and one GB of memory, characteristics of the matched pattern or template might include a sequence of commands that serve for (1) determining a set of nodes that are feasible for hosting the VM, (2) determining which of the feasible nodes are to be considered for load balancing and/or resilience, (3) determining one or more optimal allocations of the VM and its resources onto one or more nodes, and (4) determining a listing of write-ahead log entries that are to be used for monitoring and ongoing compliance/enforcement. In some cases, any/all of the foregoing determinations involve combining templates and applicable rules. Strictly as one example, if a virtual machine specification calls for a two CPUs, each with respective memory demands, then on the basis of the demand for two CPUs a resource usage rule might be fired such that a determination is made as to what order to schedule the assignments (e.g., node assignments), and allocations (e.g., memory allocations). In some cases, a resource usage rule might include scheduling information such that parallelization can be implemented for some of the actions.

As shown, the command compiler 350 accesses a set of resource usage rules (step 508). For example, resource usage rules 548 might be accessed to determine any constraints pertaining to how computing system resources are compliantly deployed, implemented, or otherwise used. Resource usage rules 548 might be established in accordance with user preferences, policies, and/or other data sources.

Based at least in part on the then-current resource conditions and/or resource usage rules, one or more system resources are assigned to the specified resource entity (step 510). As shown in the "resources" section of the sample resource specifications $544_2$, a specific set of virtual disks (e.g., virtual disk "vdk456" and virtual disk "vdk789") from cluster "C1" are assigned to virtual machine "vm123". In this example, the resource usage rules 548 may have indicated that the two virtual disks for virtual machine "vm123" are to be sized at "30480" MB, and the then-current resource conditions may have indicated that cluster "C1" has sufficient storage available for these virtual disks. A set of one or more resource management commands are then generated based at least in part on the specification parameters and assigned resources (step 512). As an example, sample resource management commands 536 depict four commands that might be generated by command compiler 350 to implement the target resource entity state depicted by sample resource specifications $544_1$ in accordance with the computing system conditions 342 and/or resource usage rules 548.

The foregoing discussions describe a technique for executing resource management commands (e.g., step 260 through step 266 of FIG. 2), which techniques are disclosed in further detail as follows.

Figure 6:
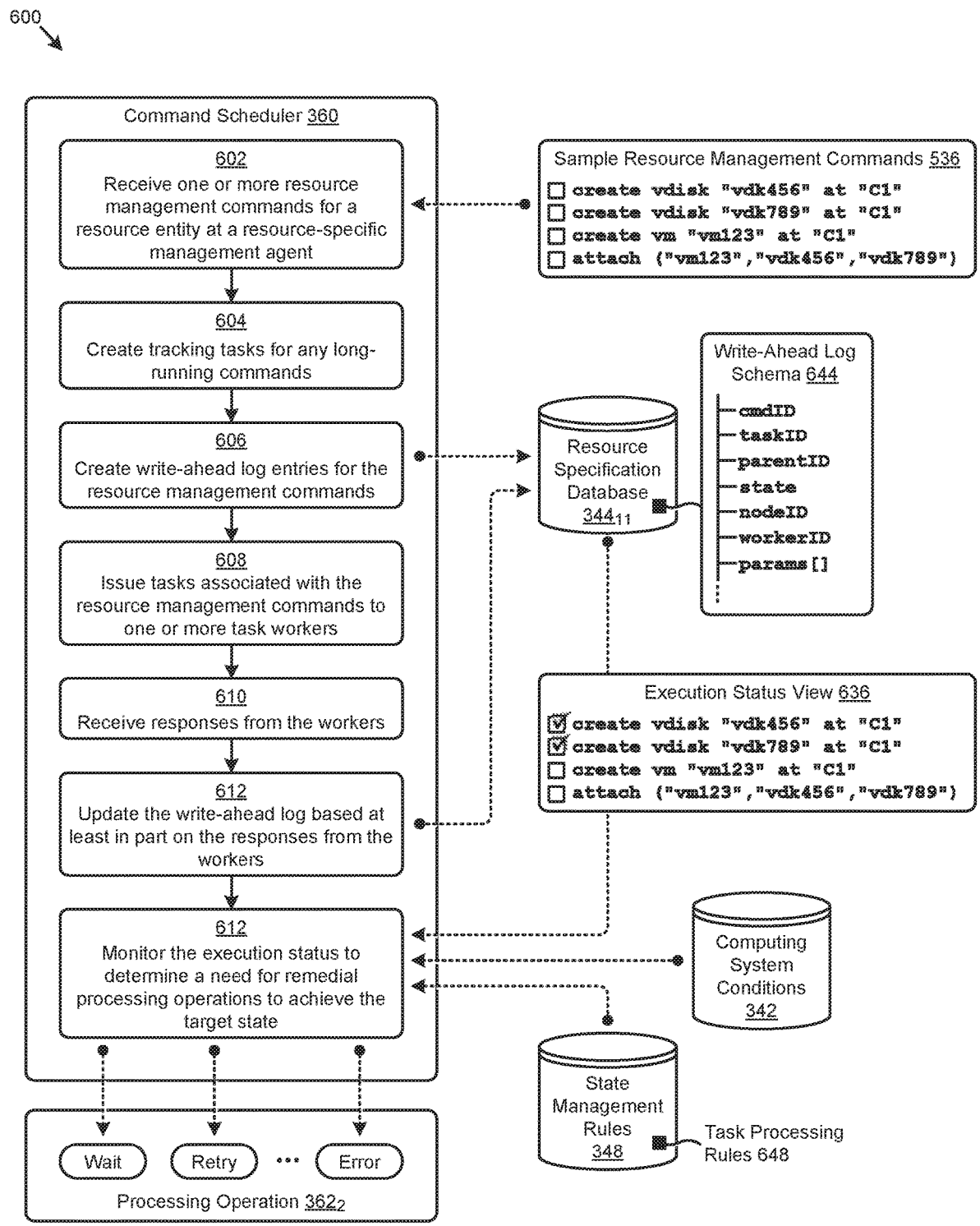
FIG. 6 depicts a resource command scheduling technique as implemented in systems for configuring computing systems using resource state specifications, according to some embodiments.

FIG. 6 depicts a resource command scheduling technique 600 as implemented in systems for configuring computing systems using resource state specifications. As an option, one or more variations of resource command scheduling technique 600 or any aspect thereof may be implemented in the context of the architecture and functionality of the embodiments described herein. The resource command scheduling technique 600 or any aspect thereof may be implemented in any environment.

The resource command scheduling technique 600 presents one embodiment of certain steps and/or operations for scheduling of resource management commands to facilitate configuring computing systems using resource state specifications. Various illustrations, specialized data structures, and sample data are also presented to further describe certain aspects of the resource command scheduling technique 600. As shown, the resource command scheduling technique 600 might be implemented in the command scheduler 360 of resource-specific management agent 210 as earlier presented and described as pertains to FIG. 3. The resource command scheduling technique 600 can be implemented in the command scheduler of any respective resource-specific management agent.

The resource command scheduling technique 600 can commence by receiving at the resource-specific management agent a set of resource management commands for a resource entity (step 602). For example, sample resource management commands 536 might be received at the resource-specific management agent. Tracking tasks for certain long-running commands are created (step 604). As an example, multiple tracking tasks that indicate completion of respective stages of a single long-running command might be created.

A write-ahead log area and/or write-ahead log entries are created for each of the resource management commands (step 606). As can be observed, a write-ahead log (WAL) that accords with the associated write-ahead log schema 644 might be materialized (e.g., as a relational database table or set of relational database tables) in a resource specification database $344_{11}$. The shown write-ahead log schema 644 indicates that the WAL information might be organized and/or stored in a tabular structure that has rows that relate various attributes to a particular resource management command. However, the WAL can take any alternative forms in any type of storage areas.

As one such alternative, the information might be organized and/or stored in a programming code object that has instances corresponding to a particular resource management command and properties corresponding to the various attributes associated with the resource management command. As depicted in write-ahead log schema 644, a data record (e.g., table row or object instance) for a particular resource management command might associate a command identifier (e.g., stored in a "cmdID" field), a task identifier (e.g., stored in a "taskID" field), a parent task or command identifier (e.g., stored in a "parentID" field), an execution state (e.g., stored in a "state" field), a processing environment identifier (e.g., stored in a "node ID" field), a worker service identifier (e.g., stored in a "workerID" field), a list of task parameters (e.g., stored in a "params[ ]" object), and/or other attributes.

The resource command scheduling technique 600 further issues tasks associated with the resource management commands to one or more computing services (e.g., worker processes, worker threads, etc.) (step 608). Responses are received from the workers (step 610) and used to update the WAL (step 612). The execution status (e.g., from the WAL) is monitored to determine if remediation actions (e.g., processing operations 3622), if any, are needed to remediate errors encountered or to otherwise advance achievement of the specified target state (step 612).

For example, as shown in execution status view 636, the WAL might indicate the virtual disks "vdk456" and "vdk789" at cluster "C1" have been created, but the virtual machine "vm123" has not been created and the virtual disks have not been attached to the virtual machine. The then-current resource conditions from computing system conditions 342 and/or a set of task processing rules 648 from the state management rules 348 might also be consulted when determining processing operations. In this example, if computing system conditions 342 indicate the service called to create the virtual machine is active, then a "Wait" operation from processing operations 3622 might be invoked.

If the wait time breaches a threshold specified in task processing rules 648 (e.g., due to resource unavailability), a "Retry" operation might be invoked to create the virtual machine using another service. In some cases, the execution status and/or other information might invoke an "Error" operation issued to the client (e.g., user, process, etc.). Other processing operations and/or execution scenarios are possible.

As discussed supra, the compiler and/or its agents perform operations involving system-wide load balancing (e.g., to achieve a fair allocation across the system), system-level and node-level sizing (e.g., to avoid over-allocation of node or system resources), as well as node-level capabilities (e.g., to be able to assign resources to nodes that are matched in terms of capability demands with respect to capability availabilities). In some cases, determination of how to schedule operations can be facilitated using data structures and/or rules that comport with a set of concurrent task execution scenarios.

Some of the scenarios for concurrent execution are particularly effective in distributed architectures having a plurality of nodes that are similarly configured. Strictly as examples, concurrent scheduling might be based at least in part on then-current conditions of the system such that, for example, an operation that is deemed to be compute-intensive to perform is scheduled to be performed on a node that is particularly-configured for compute-oriented tasks. Or, for example, an operation that is deemed to be storage-intensive is scheduled to be performed on a node that is particularly-configured for storage-oriented tasks. The resource specification, and more particularly the values (e.g., TRUE/FALSE indications, quantities, etc.) of a resource specification can be used to select a particular node. In some cases, the value of a resource specification is used singly or in combination with other resource specification values to optimize resource allocation and/or load balancing.

More specifically, in some embodiments, worker tasks that are associated with the resource management commands might be executed concurrently on different nodes. In certain other embodiments, concurrent task execution might be performed by looping through each of the computation units (e.g., tasks) in the computing system to facilitate the distribution of the workload. Another concurrent task execution approach uses one or more servers/nodes in a master-slave configuration. In this case, a single master node receives all task requests and forwards them to slaves for execution. Another approach to concurrent task execution might use a distributed task execution queue. For example, a distributed system might set up a shared queue or request pipeline, which is accessible to all the computation nodes on the system (e.g., in a clustered system).

Particular embodiments of the herein disclosed techniques can be implemented in a distributed architecture that may enable concurrent task execution on multiple nodes. Specifically, certain embodiments or techniques for concurrent task execution can facilitate performance of the capabilities and/or generation and/or delivery of the types of results as are itemized in Table 2.

TABLE 2

Concurrent task execution in a distributed architecture

| Item | Capabilities/Results |
|---|---|
| 1 | Submission of tasks to any computing node in a computing cluster |
| 2 | An instance of a task execution engine (e.g., command scheduler) can run on every computation unit (e.g., computing node); any task execution engine that receives an execution request may process the request and save it to the persistent store (e.g., to a write-ahead log) |
| 3 | Each instance of the task execution engine may run an algorithm to periodically scan the database for a list of submitted requests that do not have an owner; if such a request exists, the task execution engine selects the first request for execution and claims ownership |
| 4 | Race conditions between different nodes can be handled by having the first instance of the task execution engine successfully claiming ownership of a request (e.g., via an API request) and having the other instance(s) back-off in increments |
| 5 | Any engine instance may periodically update API requests in flight to indicate the liveness of execution |
| 6 | Any node may run a scheduled reaper process to detect API requests that are stuck due to crashes or node downtime and reset their ownership so they are eligible for re-execution |
| 7 | Work is distributed in a uniform and equitable manner, which in turn achieves a higher net system throughput |

TABLE 2-continued

Concurrent task execution in a distributed architecture

| Item | Capabilities/Results |
|------|---------------------|
| 8 | API requests that are resilient to node downtime and are automatically restarted on another node |
| 9 | The architecture naturally and inherently scales out because it is based on active-active node configurations rather than leadership or master-slave based configurations |
| 10 | Superior execution efficiency is garnered by eliminating hard locks and substituting them with an intra-cluster co-operation scheme |
| 11 | Crash consistency is achieved since the API submissions (e.g., requests) are persisted |
| 12 | Node crash resilience is facilitated through detection of anomalies and automatic continuation of API requests via execution on a different node |
| 13 | Scaling out of task execution is achieved by adding processing nodes to the system when needed |
| 14 | The architecture results in more efficient API request execution since there is no overhead pertaining to request delegation from master to slave or to allocation of resources for shared queues |
| 15 | The architecture results in more efficient work distribution as the request endpoint is decoupled from the execution endpoint |

One embodiment of a framework for implementing state-based and/or specifications-based configurations is disclosed as follows.

Figure 7:
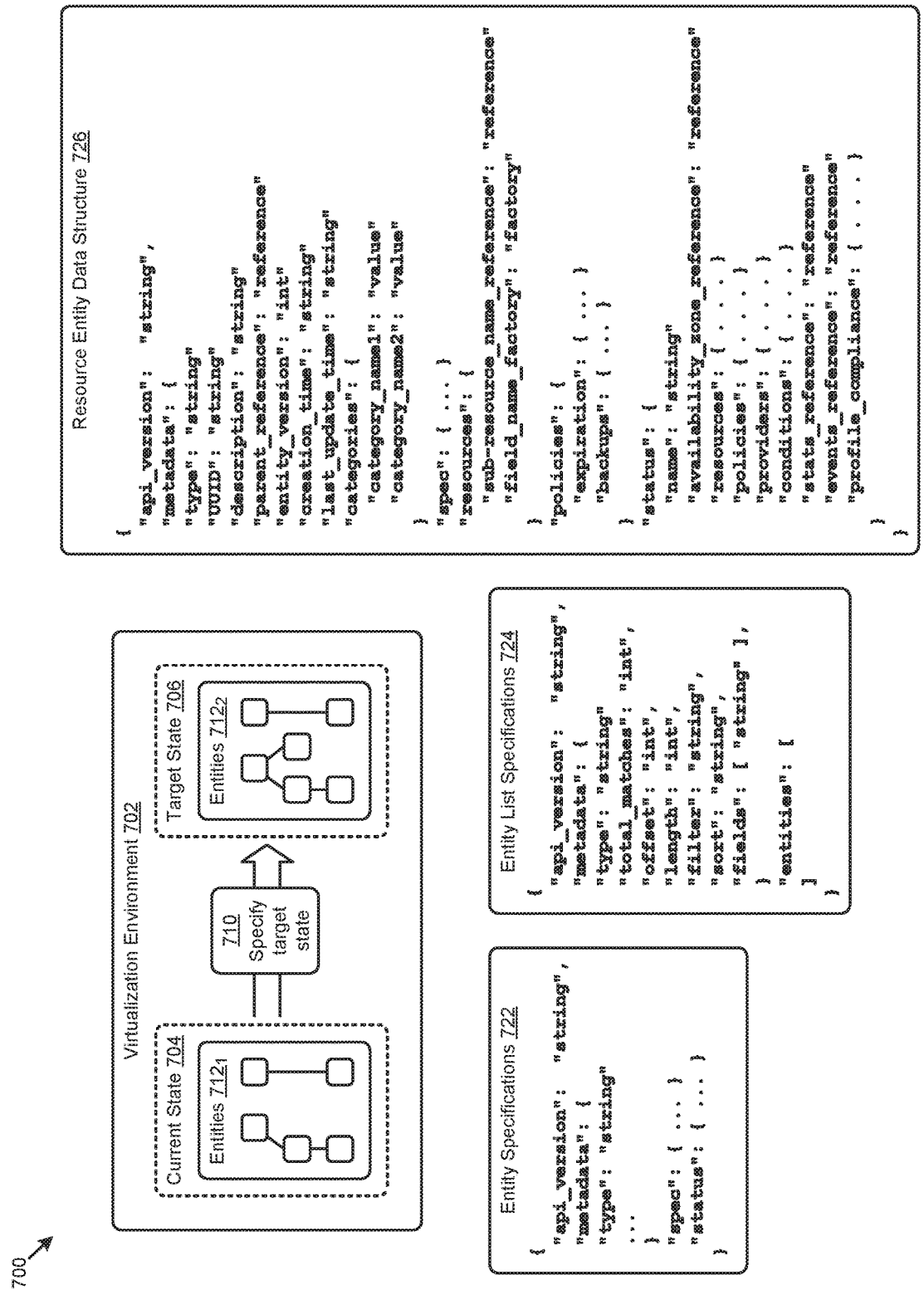
FIG. 7 depicts a state-based configuration framework as implemented in systems for configuring computing systems using resource state specifications, according to some embodiments.

FIG. 7 depicts a state-based configuration framework 700 as implemented in systems for configuring computing systems using resource state specifications. As an option, one or more variations of state-based configuration framework 700 or any aspect thereof may be implemented in the context of the architecture and functionality of the embodiments described herein. The state-based configuration framework 700 or any aspect thereof may be implemented in any environment.

Virtualized entities and/or infrastructure elements of a virtualization environment can be described using entity specifications 722. Any number of such entity specifications can be combined into a listing of entities. For example, an application in a virtualized environment might comprise one or more virtual machines, one or more virtual disks, one or more virtualized network connections, etc., all of which combine to form the set of virtualized entities and infrastructure elements needed to implement the application. Any or all of such virtualized entities and infrastructure elements can be amalgamated into one data structure such as is depicted by the shown entity list specifications 724. Furthermore, any combinations of entity specifications 722 and entity list specifications can be stored in a data structure. In some cases, any or all of the foregoing combinations can be stored in a text-oriented data structure such as in a JSON representation or scripting language (e.g., as shown in the example resource entity data structure 726) that is organized to hold keys and values in an easy-to-read and easy-to-manage format.

When managing changes to virtualized entities and/or infrastructure elements of a virtualization environment, a current state 704 (as defined by an entity and its state and/or as described by a set of entities and their respective states) can be associated with a user-specified target state. The user-specified target state can be pursued using the aforementioned techniques. During processing of operations that implement such a pursuit, the values of the resource entity data structure 726 may change, for example, as virtualized entities are created and populated and/or as the specified policies are populated with pointers to the policy enforcement code, etc. The embodiments of the shown entity specifications 722 as well as the shown entity list specifications 724 are suited to characterize states and state transitions of virtualized entities in a virtualization environment.

A state management service can transition from a current state of any entity or object or element to a target state of that entity or object or element. In particular, state management service can manage changes to infrastructure elements of a virtualization environment 702. In example cases, in order to transition from a current state 704 to a target state 706, particular embodiments may simply require specification of target state 706 (operation 710) rather than using step-by-step instructions to achieve the target state 706. A particular state associated with virtualization environment 702 may be described as a hierarchical collection of entities (e.g., entities $712_1$, entities $712_2$), each of which may comprise a group of sub-entities, as well as a state of each of the entities in the collection. For example, any of the entities in virtualization environment 702 may be represented using an entity specification 722. As can be observed, entity specification 722 may include a "metadata" section for specifying metadata for the entity, a "type" section for specifying the type of the entity, a "spec" section for specifying the desired state of the entity, a "status" section for specifying the current state of the entity, and/or other sections. Collections of entities in virtualization environment 702 may be represented using an entity list specification 724.

In particular embodiments, entity types may fall into one of two categories: resource entity types or helper entity types. Resource entity types might include entities that represent a physical or virtual infrastructure resource (e.g., a vm, an alert, an app, a volume_group, etc.). Helper entity types might include entities (e.g., an alert, an event, a status, etc.) that are used in conjunction with infrastructure resources. In particular embodiments, resource entity types may further fall into one of two subcategories: basic resource types (e.g., vm, etc.) or related resource types that are related to basic resource-type entities (e.g., vm_backup, vm_snapshot, vm_profile, vm_template, etc.). All resource types may support one or more actions (e.g., create( ), destroy( ), snapshot( ), restore( ), move( ), clone( ), diff( ), etc.).

For example, each entity deemed to be a resource entity type may be represented using a resource entity data structure 726. In particular embodiments, the parent_reference field may be modified by a user. In particular embodiments, the categories section may comprise a set of keys that are mapped to string values that indicate the policies to be enforced on this entity. In particular embodiments, the spec section may specify all settings that affect the behavior of the entity, its relationships to other entities, or particular settings that may take time to change. Still more particularly, in certain embodiments the resources field may specify all resources that should be owned by the corresponding entity.

In particular embodiments, the policies field may specify all settings that modify the behavior of this entity (e.g., expiration policy, security policy, backup policy, other custom policies). In particular embodiments, the status field is not included in snapshots. In particular embodiments, the availability_zone_reference field may specify a reference to the availability zone from which this entity derives its resources. In particular embodiments, the providers field may be a section of the spec that the external providers own and maintain (e.g., including the corresponding status).

All entities can exist independently such that they do not depend on some other entity for their meaningful existence.

Such entities may be represented as a top-level API call string (e.g., /<entity_kind_plural>). Other entities may only exist as children of a parent entity in the hierarchy. Such entities may be represented in the parent API as shown in the following example call string:

/<parent_entity_kind_plural>/{UUID}/<child_entity_kind_plural>/{child UUID}

In particular embodiments, all entities may explicitly specify relationships (e.g., parent-child relationships) in their entity specification. Certain embodiments may enable promotion of a child entity type to a top-level entity without having to change any resource specifications.

The foregoing discussion of FIG. 7 describes the herein disclosed techniques as implemented in a virtualization environment. One embodiment of a distributed virtualization environment is disclosed in further detail as follows.

Figure 8:
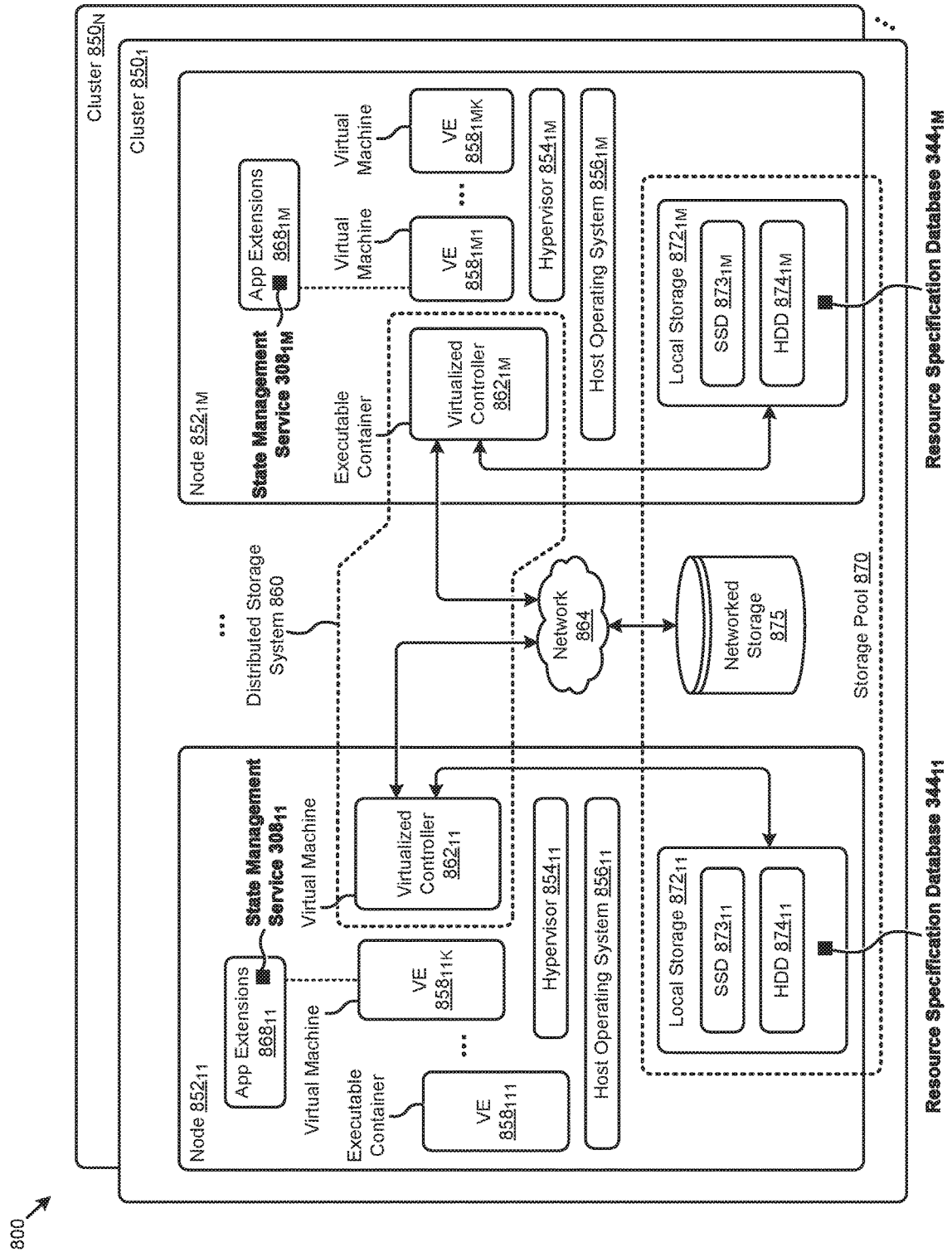
FIG. 8 depicts a distributed virtualization environment in which embodiments of the present disclosure can be implemented.

FIG. 8 depicts a distributed virtualization environment 800 in which embodiments of the present disclosure can be implemented. As an option, one or more variations of distributed virtualization environment 800 or any aspect thereof may be implemented in the context of the architecture and functionality of the embodiments described herein.

The shown distributed virtualization environment depicts various components associated with one instance of a distributed virtualization system (e.g., hyperconverged distributed system) comprising a distributed storage system 860 that can be used to implement the herein disclosed techniques. Specifically, the distributed virtualization environment 800 comprises multiple clusters (e.g., cluster $850_1, \ldots,$ cluster $850_N$) comprising multiple nodes that have multiple tiers of storage in a storage pool. Representative nodes (e.g., node $852_{11}, \ldots,$ node $852_{1M}$) and storage pool 870 associated with cluster $850_1$ are shown. Each node can be associated with one server, multiple servers, or portions of a server. The nodes can be associated (e.g., logically and/or physically) with the clusters. As shown, the multiple tiers of storage include storage that is accessible through a network 864, such as a networked storage 875 (e.g., a storage area network or SAN, network attached storage or NAS, etc.). The multiple tiers of storage further include instances of local storage (e.g., local storage $872_{11}, \ldots,$ local storage $872_{1M}$). For example, the local storage can be within or directly attached to a server and/or appliance associated with the nodes. Such local storage can include solid state drives (SSD $873_{11}, \ldots,$ SSD $873_{1M}$), hard disk drives (HDD $874_{11},$ HDD $874_{1M}$), and/or other storage devices.

As shown, any of the nodes in the distributed virtualization environment 800 can implement one or more user virtualized entities (e.g., VE $858_{11j},$ VE $858_{11K}, \ldots,$ VE $858_{1M1},$ VE $858_{1MK}$), such as virtual machines (VMs) and/or containers. The VMs can be characterized as software-based computing "machines" implemented in a hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $856_{11}, \ldots,$ host operating system $856_{1M}$), while the VMs run multiple applications on various respective guest operating systems. Such flexibility can be facilitated at least in part by a hypervisor (e.g., hypervisor $854_{11},$ hypervisor $854_{1M}$), which hypervisor is logically located between the various guest operating systems of the VMs and the host operating system of the physical infrastructure (e.g., node).

As an example, hypervisors can be implemented using virtualization software (e.g., VMware ESXi, Microsoft Hyper-V, RedHat KVM, Nutanix AHV, etc.) that includes a hypervisor. In comparison, the containers (e.g., application containers or ACs) are implemented at the nodes in an operating system virtualization environment or container virtualization environment. The containers comprise groups of processes and/or resources (e.g., memory, CPU, disk, etc.) that are isolated from the node host computer and other containers. Such containers directly interface with the kernel of the host operating system (e.g., host operating system $856_{11}, \ldots,$ host operating system $856_{1M}$) without, in most cases, a hypervisor layer. This lightweight implementation can facilitate efficient distribution of certain software components, such as applications or services (e.g., micro-services). As shown, distributed virtualization environment 800 can implement both a hypervisor-assisted virtualization environment and a container virtualization environment for various purposes.

The distributed virtualization environment 800 also comprises at least one instance of a virtualized controller to facilitate access to storage pool 870 by the VMs and/or containers.

As used in these embodiments, a virtualized controller is a collection of software instructions that serve to abstract details of underlying hardware or software components from one or more higher-level processing entities. A virtualized controller can be implemented as a virtual machine, as a container (e.g., a Docker container), or within a layer (e.g., such as a layer in a hypervisor).

Multiple instances of such virtualized controllers can coordinate within a cluster to form the distributed storage system 860 which can, among other operations, manage the storage pool 870. This architecture further facilitates efficient scaling of the distributed virtualization system. The foregoing virtualized controllers can be implemented in distributed virtualization environment 800 using various techniques. Specifically, an instance of a virtual machine at a given node can be used as a virtualized controller in a hypervisor-assisted virtualization environment to manage storage and I/O (input/output or JO) activities. In this case, for example, the virtualized entities at node $852_{11}$ can interface with a controller virtual machine (e.g., virtualized controller $862_{11}$) through hypervisor $854_{11}$ to access storage pool 870. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 860.

For example, a hypervisor at one node in the distributed storage system 860 might correspond to VMware ESXi software, and a hypervisor at another node in distributed storage system 860 might correspond to Nutanix AHV software. As another virtualized controller implementation example, containers (e.g., Docker containers) can be used to implement a virtualized controller (e.g., virtualized controller $862_{1M}$) in an operating system virtualization environment at a given node. In this case, for example, the virtualized entities at node $852_{1M}$ can access the storage pool 870 by interfacing with a controller container (e.g., virtualized controller $862_{1M}$) through hypervisor $854_{1M}$ and/or the kernel of host operating system $856_{1M}$.

In certain embodiments, one or more instances of a state management service can be implemented in the distributed virtualization environment 800 to facilitate the herein disclosed techniques. In certain embodiments, the state management service can be implemented as an application extension (e.g., app extension) managed by a virtualized entity (e.g., VM, executable container, etc.). More specifically, the state management service might be implemented as a containerized application extension managed by a virtualized container service machine. As shown in FIG. 8, state management service $308_{11}$ is implemented in a set of app extensions $868_{11}$ managed by VE $858_{11K}$ (e.g., a virtualized container service machine) in node $852_{11}$, and state management service $308_{1M}$ is implemented in a set of app extensions $868_{1M}$ managed by VE $858_{1M1}$ (e.g., a virtualized container service machine) in node $852_{1M}$. In other embodiments, instances of the state management service are implemented in respective instances of the virtualized controller. Such instances of the virtualized controller, the state management service, the app extensions, and/or the virtualized service machines can be implemented in any node in any cluster. Actions taken by one or more instances of the state management service and/or virtualized controller can apply to a node (or between nodes), and/or to a cluster (or between clusters), and/or between any resources or subsystems accessible by the virtualized controller or their agents (e.g., state management service). As further shown, the metadata and datastores associated with the herein disclosed techniques can be stored in various storage facilities in storage pool 870. As an example, resource specification database $344_{11}$ might be stored at local storage $872_{11}$, and resource specification database $344_{1M}$ might be stored at local storage $872_{1M}$.

ADDITIONAL EMBODIMENTS OF THE DISCLOSURE

Additional Practical Application Examples

Figure 9:
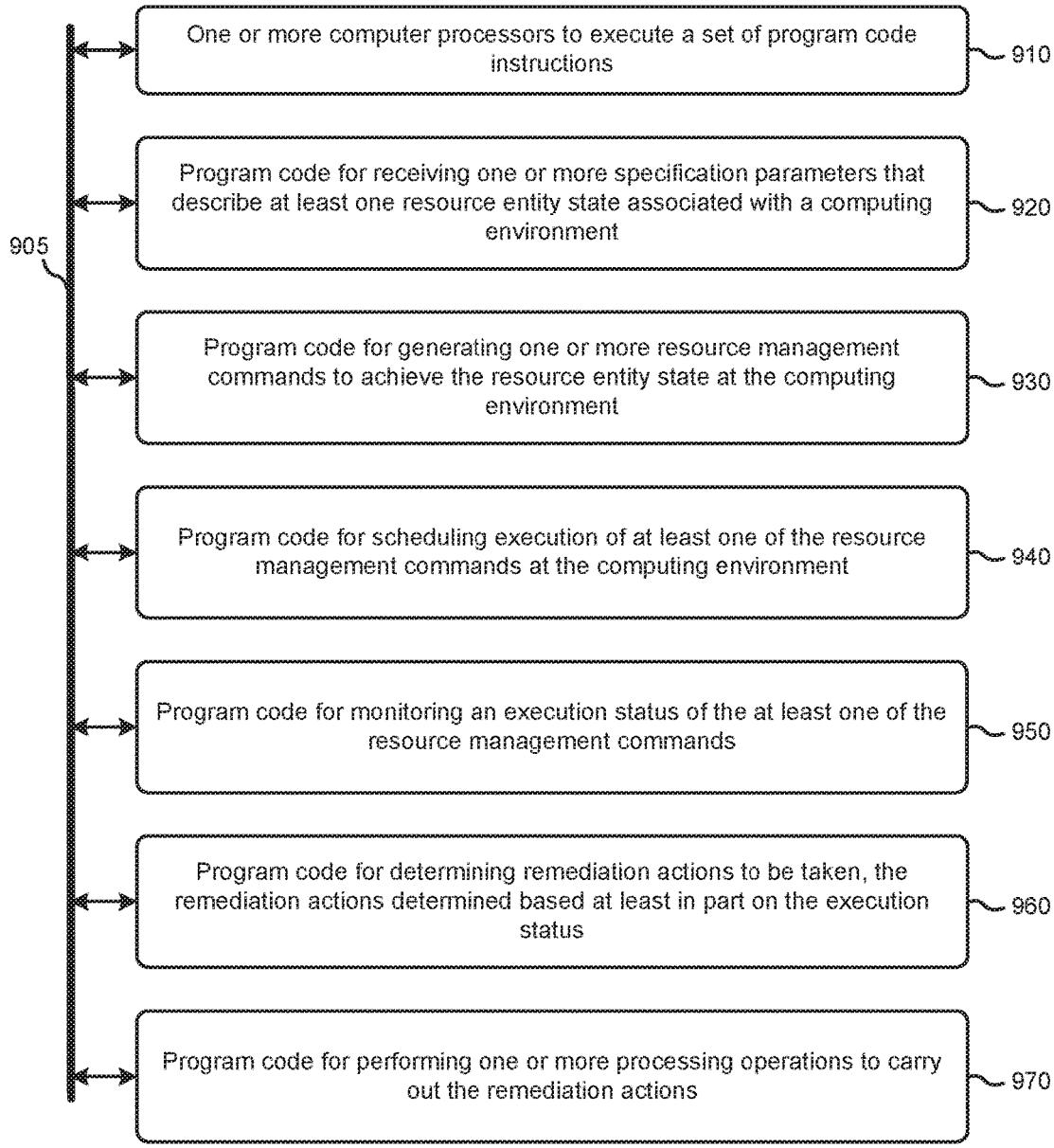
FIG. 9 depicts system components as arrangements of computing modules that are interconnected so as to implement certain of the herein-disclosed embodiments.

FIG. 9 depicts a system 900 as an arrangement of computing modules that are interconnected so as to operate cooperatively to implement certain of the herein-disclosed embodiments. This and other embodiments present particular arrangements of elements that, individually and/or as combined, serve to form improved technological processes that address facilitating user-managed configurations of complex computing systems that are managed by numerous users with varying configuration procedure development skills. The partitioning of system 900 is merely illustrative and other partitions are possible. As an option, the system 900 may be implemented in the context of the architecture and functionality of the embodiments described herein. Of course, however, the system 900 or any operation therein may be carried out in any desired environment.

The system 900 comprises at least one processor and at least one memory, the memory serving to store program instructions corresponding to the operations of the system. As shown, an operation can be implemented in whole or in part using program instructions accessible by a module. The modules are connected to a communication path 905, and any operation can communicate with other operations over communication path 905. The modules of the system can, individually or in combination, perform method operations within system 900. Any operations performed within system 900 may be performed in any order unless as may be specified in the claims.

The shown embodiment implements a portion of a computer system, presented as system 900, comprising one or more computer processors to execute a set of program code instructions (module 910) and modules for accessing memory to hold program code instructions to perform: receiving one or more specification parameters that describe at least one resource entity state associated with a computing environment (module 920); generating one or more resource management commands to achieve the resource entity state at the computing environment (module 930); scheduling execution of at least one of the resource management commands at the computing environment (module 940); monitoring an execution status of the at least one of the resource management commands (module 950); determining remediation actions to be taken, the remediation actions being determined based at least in part on the execution status (module 960); and performing one or more processing operations to carry out the remediation actions (module 970).

Variations of the foregoing may include more or fewer of the shown modules. Certain variations may perform more or fewer (or different) steps, and/or certain variations may use data elements in more, or in fewer (or different) operations. Still further, some embodiments include variations in the operations performed, and some embodiments include variations of aspects of the data elements used in the operations.

System Architecture Overview

Additional System Architecture Examples

Figure 10A:
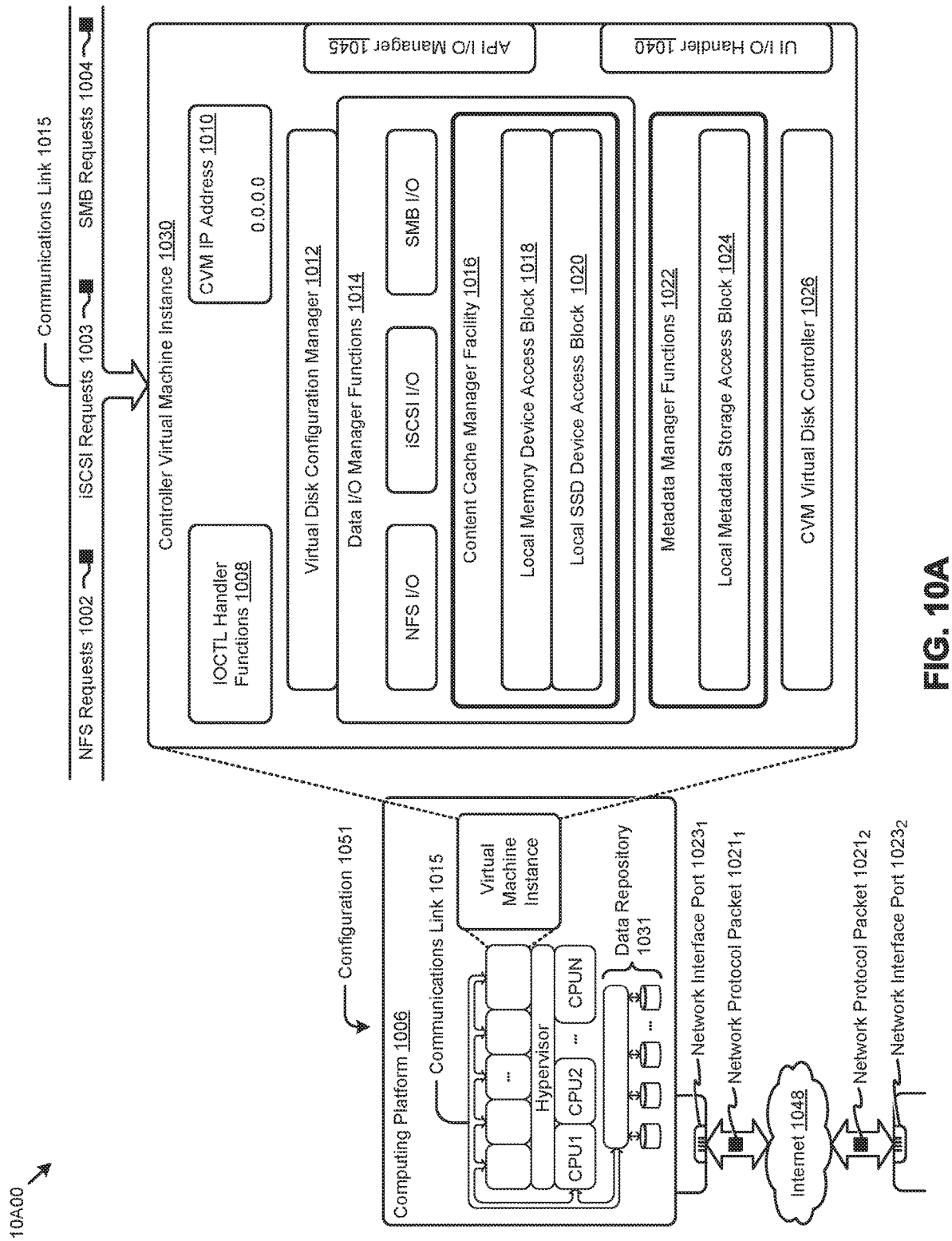
FIG. 10A, FIG. 10B, and FIG. 10C depict virtualized controller architectures comprising collections of interconnected components suitable for implementing embodiments of the present disclosure and/or for use in the herein-described environments.

FIG. 10A depicts a virtualized controller as implemented by the shown virtual machine architecture 10A00. The heretofore-disclosed embodiments, including variations of any virtualized controllers, can be implemented in distributed systems where a plurality of networked-connected devices communicate and coordinate actions using inter-component messaging.

Distributed systems are systems of interconnected components that are designed for, or dedicated to, storage operations as well as being designed for, or dedicated to, computing and/or networking operations. Interconnected components in a distributed system can operate cooperatively to achieve a particular objective, such as to provide high performance computing, high performance networking capabilities, and/or high performance storage and/or high capacity storage capabilities. For example, a first set of components of a distributed computing system can coordinate to efficiently use a set of computational or compute resources, while a second set of components of the same distributed storage system can coordinate to efficiently use a set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, the virtual machine architecture 10A00 comprises a collection of interconnected components suitable for implementing embodiments of the present disclosure and/or for use in the herein-described environments. Moreover, the virtual machine architecture 10A00 includes a virtual machine instance in configuration 1051 that is further described as pertaining to controller virtual machine instance 1030. Configuration 1051 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 1030.

In this and other configurations, a controller virtual machine instance receives block I/O (input/output or IO) storage requests as network file system (NFS) requests in the form of NFS requests 1002, and/or internet small computer storage interface (iSCSI) block IO requests in the form of iSCSI requests 1003, and/or Samba file system (SMB) requests in the form of SMB requests 1004. The controller virtual machine (CVM) instance publishes and responds to an internet protocol (IP) address (e.g., CVM IP address 1010). Various forms of input and output (I/O or IO) can be handled by one or more IO control handler functions (e.g., IOCTL handler functions 1008) that interface to other functions such as data IO manager functions 1014 and/or metadata manager functions 1022. As shown, the data IO manager functions can include communication with virtual disk configuration manager 1012 and/or can include direct or indirect communication with any of various block IO functions (e.g., NFS IO, iSCSI IO, SMB IO, etc.).

In addition to block IO functions, configuration 1051 supports IO of any form (e.g., block IO, streaming IO, packet-based IO, HTTP traffic, etc.) through either or both of a user interface (UI) handler such as UI IO handler 1040 and/or through any of a range of application programming interfaces (APIs), possibly through API IO manager 1045.

Communications link 1015 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as random access memory. As shown, controller virtual machine instance 1030 includes content cache manager facility 1016 that accesses storage locations, possibly including local dynamic random access memory (DRAM) (e.g., through local memory device access block 1018) and/or possibly including accesses to local solid state storage (e.g., through local SSD device access block 1020).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 1031, which in turn can be formatted into any one or more storage areas, and which can comprise parameterized storage accessible by a key (e.g., a filename, a table name, a block address, an offset address, etc.). External data repository 1031 can store any forms of data, and may comprise a storage area dedicated to storage of metadata pertaining to the stored forms of data. In some cases, metadata can be divided into portions. Such portions and/or cache copies can be stored in the external storage data repository and/or in a local storage area (e.g., in local DRAM areas and/or in local SSD areas). Such local storage can be accessed using functions provided by local metadata storage access block 1024. External data repository 1031 can be configured using CVM virtual disk controller 1026, which can in turn manage any number or any configuration of virtual disks.

Execution of the sequences of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 1051 can be coupled by communications link 1015 (e.g., backplane, LAN, PSTN, wired or wireless network, etc.) and each instance may perform respective portions of sequences of instructions as may be required to practice embodiments of the disclosure.

The shown computing platform 1006 is interconnected to the Internet 1048 through one or more network interface ports (e.g., network interface port $1023_1$ and network interface port $1023_2$). Configuration 1051 can be addressed through one or more network interface ports using an IP address. Any operational element within computing platform 1006 can perform sending and receiving operations using any of a range of network protocols, possibly including network protocols that send and receive packets (e.g., network protocol packet $1021_1$ and network protocol packet $1021_2$).

Computing platform 1006 may transmit and receive messages that can be composed of configuration data and/or any other forms of data and/or instructions organized into a data structure (e.g., communications packets). In some cases, the data structure includes program code instructions (e.g., application code) communicated through Internet 1048 and/or through any one or more instances of communications link 1015. Received program code may be processed and/or executed by a CPU as it is received and/or program code may be stored in any volatile or non-volatile storage for later execution. Program code can be transmitted via an upload (e.g., an upload from an access device over the Internet 1048 to computing platform 1006). Further, program code and/or the results of executing program code can be delivered to a particular user via a download (e.g., a download from computing platform 1006 over the Internet 1048 to an access device).

Configuration 1051 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to configuring computing systems using resource state specifications. In some embodiments, a module may include one or more state machines and/or combinational logic used to implement or facilitate the operational and/or performance characteristics pertaining to configuring computing systems using resource state specifications.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of configuring computing systems using resource state specifications). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to configuring computing systems using resource state specifications, and/or for improving the way data is manipulated when performing computerized operations pertaining to techniques for automatically converting specifications of a target resource state to a set of resource management commands that are executed to achieve the target resource state in a computing system.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 10B:
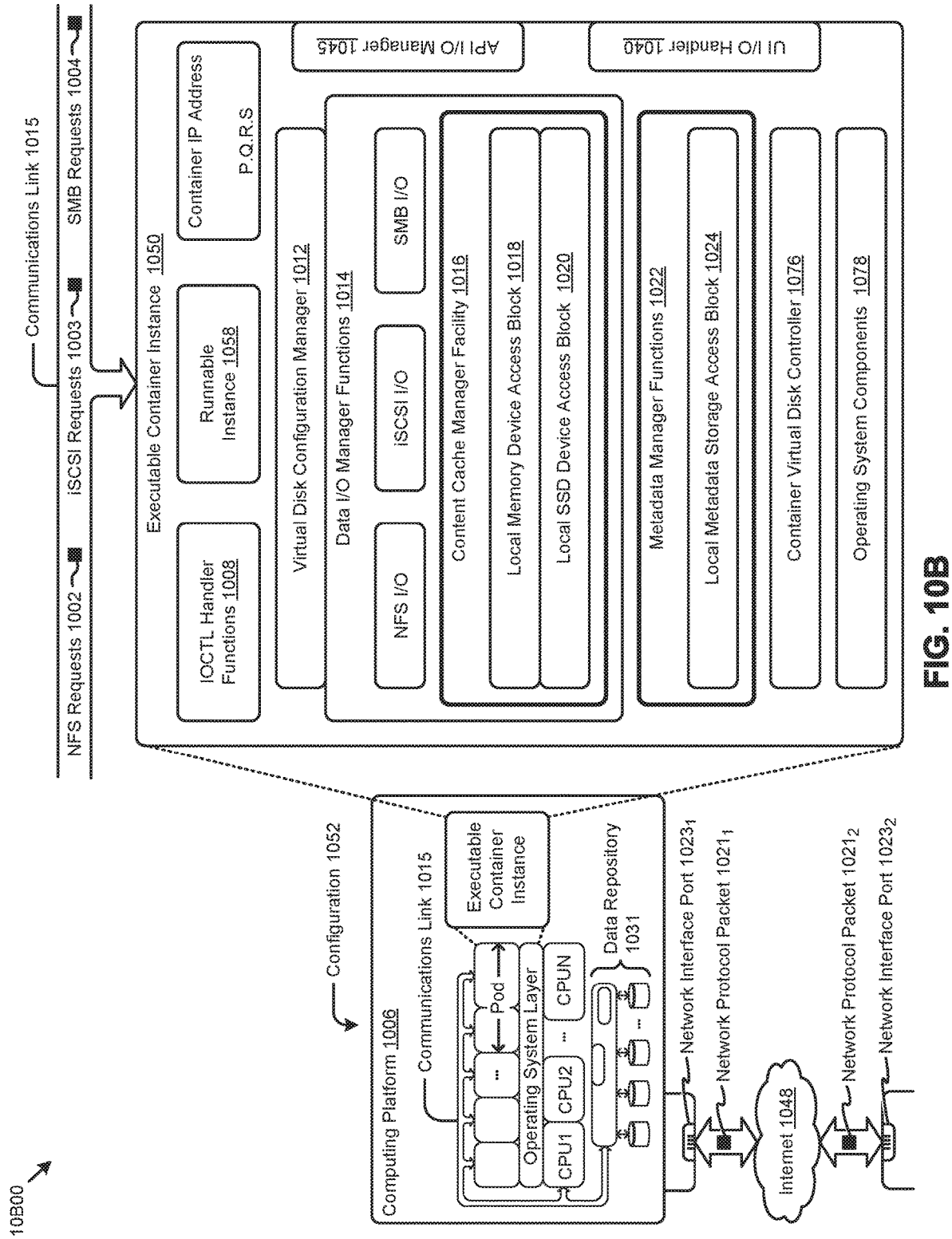

FIG. 10B depicts a virtualized controller implemented by containerized architecture 10B00. The containerized architecture comprises a collection of interconnected components suitable for implementing embodiments of the present disclosure and/or for use in the herein-described environments. Moreover, the shown containerized architecture 10B00 includes an executable container instance in configuration 1052 that is further described as pertaining to executable container instance 1050. Configuration 1052 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any executable container (e.g., executable container instance 1050). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container. Any executable container of any sort can be rooted in a directory system, and can be configured to be accessed by file system commands (e.g., "ls" or "ls –a", etc.). The executable container might optionally include operating system components 1078, however such a separate set of operating system components need not be provided. As an alternative, an executable container can include runnable instance 1058, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 1076. Such a container virtual disk controller can perform any of the functions that the aforementioned CVM virtual disk controller 1026 can perform, yet such a container virtual disk controller does not rely on a hypervisor or any particular operating system so as to perform its range of functions.

In some environments multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 10C:
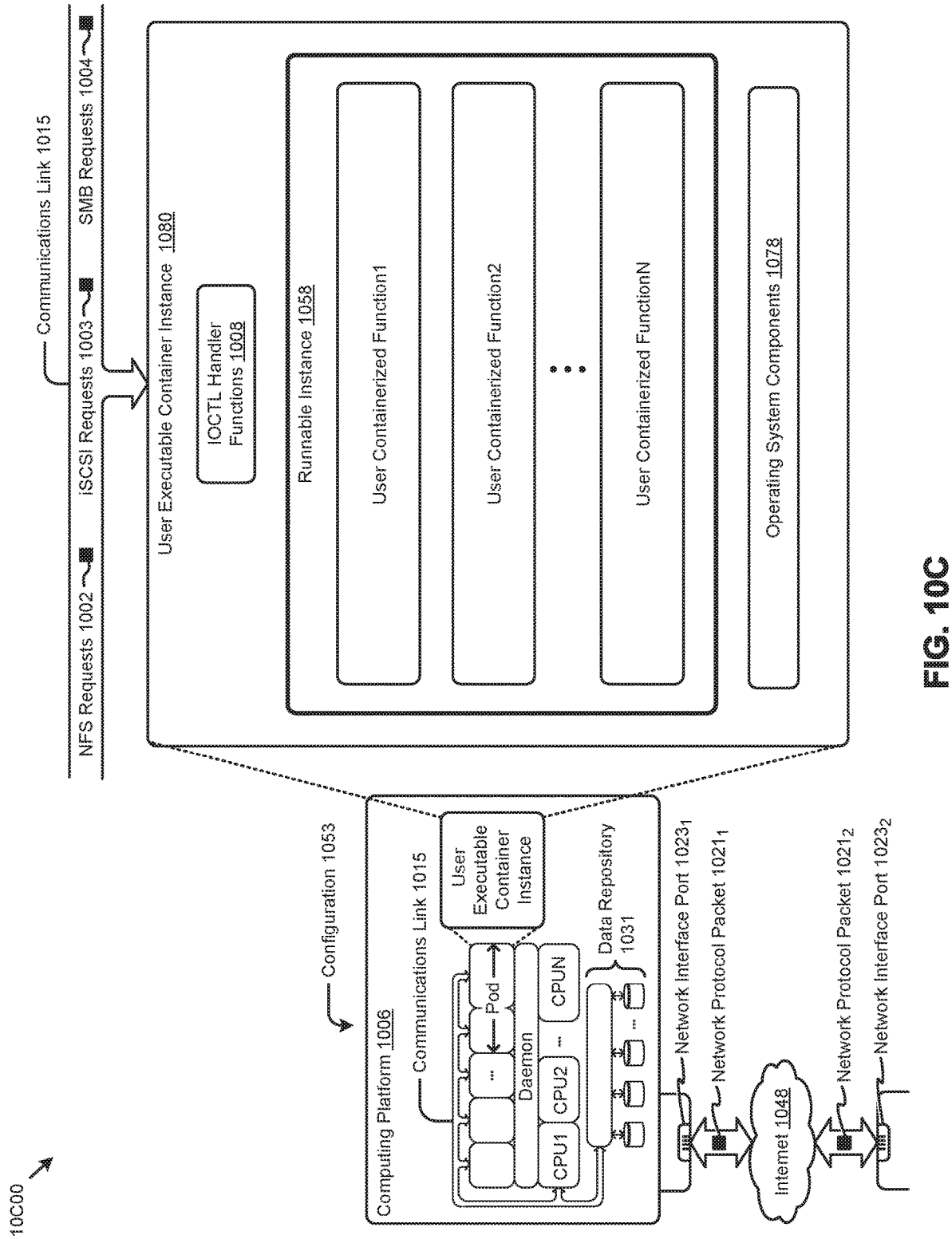

FIG. 10C depicts a virtualized controller implemented by a daemon-assisted containerized architecture 10000. The containerized architecture comprises a collection of interconnected components suitable for implementing embodiments of the present disclosure and/or for use in the herein-described environments. Moreover, the shown instance of daemon-assisted containerized architecture includes a user executable container instance in configuration 1053 that is further described as pertaining to user executable container instance 1080. Configuration 1053 includes a daemon layer (as shown) that performs certain functions of an operating system.

User executable container instance 1080 comprises any number of user containerized functions (e.g., user containerized function1, user containerized function2, . . . , user containerized functionN). Such user containerized functions can execute autonomously, or can be interfaced with or wrapped in a runnable object to create a runnable instance (e.g., runnable instance 1058). In some cases, the shown operating system components 1078 comprise portions of an operating system, which portions are interfaced with or included in the runnable instance and/or any user containerized functions. In this embodiment of a daemon-assisted containerized architecture, the computing platform 1006 might or might not host operating system components other than operating system components 1078. More specifically, the shown daemon might or might not host operating system components other than operating system components 1078 of user executable container instance 1080.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
   receiving one or more specification parameters that describe at least one resource entity state associated with a computing environment;
   generating one or more resource management commands to achieve the resource entity state at the computing environment;
   scheduling execution of at least one of the resource management commands at the computing environment;
   monitoring an execution status of the at least one of the resource management commands;
   determining remediation actions to be taken, the remediation actions being determined based at least in part on the execution status; and
   performing one or more processing operations to carry out the remediation actions.

2. The method of claim 1, further comprising creating a write-ahead log to track the execution status.

3. The method of claim 1, further comprising:
   identifying at least one resource entity associated with the specification parameters, and
   dispatching at least a portion of the specification parameters to a resource-specific management agent to process the portion of the specification parameters, the portion of the specification parameters being associated with the resource entity.

4. The method of claim 1, further comprising storing the specification parameters in a resource specification database.

5. The method of claim 1, wherein scheduling execution of the at least one of the resource management commands comprises issuing one or more tasks to one or more computing services.

6. The method of claim 5, wherein the execution status is derived from one or more responses from the one or more computing services.

7. The method of claim 1, wherein at least one of the resource management commands is generated based at least in part on at least one of, one or more conditions of the computing environment, or one or more resource usage rules.

8. The method of claim 1, wherein at least one of the processing operations is determined based at least in part on at least one of, one or more conditions of the computing environment, or one or more task processing rules.

9. The method of claim 1, wherein the execution status indicates the at least one of the resource management commands is running, is pending, has completed, or has failed.

10. The method of claim 1, wherein at least one of the processing operations is a retry operation, a wait operation, or an error operation.

11. The method of claim 1, wherein the generating of the one or more resource management commands to achieve the resource entity state at the computing environment is performed by a command compiler.

12. The method of claim 11, wherein the command compiler further carries-out at least some steps of,
consulting then-current conditions of a computing system;
using the then-current conditions of the computing system when generating the resource management commands;
scheduling at least some of a plurality of resource management commands onto at least two different nodes; and
monitoring activities at the at least two different nodes.

13. The method of claim 11, wherein at least some of the resource management commands are scheduled for sequential execution, and at least some of the resource management commands are scheduled for parallel execution.

14. A computer readable medium, embodied in a non-transitory computer readable medium, the non-transitory computer readable medium having stored thereon a sequence of instructions which, when stored in memory and executed by one or more processors causes the one or more processors to perform a set of acts, the acts comprising:
receiving one or more specification parameters that describe at least one resource entity state associated with a computing environment;
generating one or more resource management commands to achieve the resource entity state at the computing environment;
scheduling execution of at least one of the resource management commands at the computing environment;
monitoring an execution status of the at least one of the resource management commands;
determining remediation actions to be taken, the remediation actions being determined based at least in part on the execution status; and
performing one or more processing operations to carry out the remediation actions.

15. The computer readable medium of claim 14, further comprising instructions which, when stored in memory and executed by the one or more processors causes the one or more processors to perform acts of creating a write-ahead log to track the execution status.

16. The computer readable medium of claim 14, further comprising instructions which, when stored in memory and executed by the one or more processors causes the one or more processors to perform acts of:
identifying at least one resource entity associated with the specification parameters, and
dispatching at least a portion of the specification parameters to a resource-specific management agent to process the portion of the specification parameters, the portion of the specification parameters being associated with the resource entity.

17. The computer readable medium of claim 14, further comprising instructions which, when stored in memory and executed by the one or more processors causes the one or more processors to perform acts of storing the specification parameters in a resource specification database.

18. The computer readable medium of claim 14, wherein scheduling execution of the at least one of the resource management commands comprises issuing one or more tasks to one or more computing services.

19. A system comprising:
a storage medium having stored thereon a sequence of instructions; and
one or more processors that execute the instructions to cause the one or more processors to perform a set of acts, the acts comprising,
receiving one or more specification parameters that describe at least one resource entity state associated with a computing environment;
generating one or more resource management commands to achieve the resource entity state at the computing environment;
scheduling execution of at least one of the resource management commands at the computing environment;
monitoring an execution status of the at least one of the resource management commands;
determining remediation actions to be taken, the remediation actions being determined based at least in part on the execution status; and
performing one or more processing operations to carry out the remediation actions.

20. The system of claim 19, further comprising instructions which, when stored in memory and executed by the one or more processors causes the one or more processors to perform acts of,
consulting then-current conditions of a computing system;
using the then-current conditions of the computing system when generating the resource management commands;
scheduling at least some of a plurality of resource management commands onto at least two different nodes; and
monitoring activities at the at least two different nodes.

* * * * *